(12) United States Patent
Liu et al.

(10) Patent No.: US 10,863,540 B2
(45) Date of Patent: Dec. 8, 2020

(54) TERMINAL APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Liqing Liu, Sakai (JP); Shoichi Suzuki, Sakai (JP); Tomoki Yoshimura, Sakai (JP); Wataru Ouchi, Sakai (JP); Kimihiko Imamura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/340,705

(22) PCT Filed: Jul. 21, 2017

(86) PCT No.: PCT/JP2017/026489
§ 371 (c)(1),
(2) Date: Apr. 10, 2019

(87) PCT Pub. No.: WO2018/070087
PCT Pub. Date: Apr. 19, 2018

(65) Prior Publication Data
US 2019/0313451 A1    Oct. 10, 2019

(30) Foreign Application Priority Data

Oct. 11, 2016 (JP) ................................ 2016-199805

(51) Int. Cl.
*H04L 1/00* (2006.01)
*H04W 16/14* (2009.01)
(Continued)

(52) U.S. Cl.
CPC ....... *H04W 74/0808* (2013.01); *H04L 1/0063* (2013.01); *H04W 16/14* (2013.01);
(Continued)

(58) Field of Classification Search
CPC .. H04L 1/0063; H04W 16/14; H04W 72/042; H04W 72/0446; H04W 74/08; H04W 74/0808; H04W 76/11; H04W 74/0833
See application file for complete search history.

(56) References Cited

U.S. PATENT DOCUMENTS

2016/0100434 A1* 4/2016 Chen ................... H04W 52/362
370/329
2017/0251499 A1* 8/2017 Radulescu ........... H04J 11/0036
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.1.0, Mar. 2016, pp. 1-155.
(Continued)

*Primary Examiner* — Melvin C Marcelo
*Assistant Examiner* — Natali Pascual Peguero
(74) *Attorney, Agent, or Firm* — ScienBiziP, P.C.

(57) ABSTRACT

Provided is a terminal apparatus configured to receive a PDCCH including DCI format 1C to which CRC parity bits scrambled with a CC-RNTI are added, and to transmit a preamble in an LAA cell, wherein a type of an uplink LBT procedure for a PRACH transmission is determined based on whether or not a PRACH resource to be used for the PRACH transmission is at least included in a subframe in an uplink duration in which no downlink physical channel is received, and a value of the uplink duration is given based at least on an 'Uplink transmission duration and offset indication' field included in the DCI format 1C.

5 Claims, 9 Drawing Sheets

(51) Int. Cl.
  *H04W 72/04* (2009.01)
  *H04W 74/08* (2009.01)
  *H04W 76/11* (2018.01)
(52) U.S. Cl.
  CPC ......... *H04W 72/04* (2013.01); *H04W 72/042* (2013.01); *H04W 72/0446* (2013.01); *H04W 74/08* (2013.01); *H04W 76/11* (2018.02)

(56) References Cited

U.S. PATENT DOCUMENTS

2017/0265223 A1* 9/2017 Zhang ............... H04W 74/0833
2018/0242317 A1* 8/2018 Marinier ............. H04W 56/003

OTHER PUBLICATIONS

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.1.0, Mar. 2016, pp. 1-129.
"3rd Generation Partnership Project; Technical Specification Group Radio Access Network; Evolved Universal Terrestrial Radio Access (E-UTRA); Physical layer procedures (Release 13)", 3GPP TS 36.213 V13.1.1, Mar. 2016, pp. 1-361.
Ericsson et al., "New Work Item on enhanced LAA for LTE", 3GPP TSG RAN Meeting #70, RP-152272, Dec. 7-10, 2015, 8 pages.
Intel Corporation, "PRACH Transmission for eLAA", 3GPP TSG RAN WG1 Meeting #85, R1-164131, May 23-27, 2016, pp. 1-5.
Intel et al., "Way forward on the UL burst duration indication", 3GPP TSG-RAN WG1 #86, R1-168361, Aug. 22-26, 2016, 3 pages.

* cited by examiner

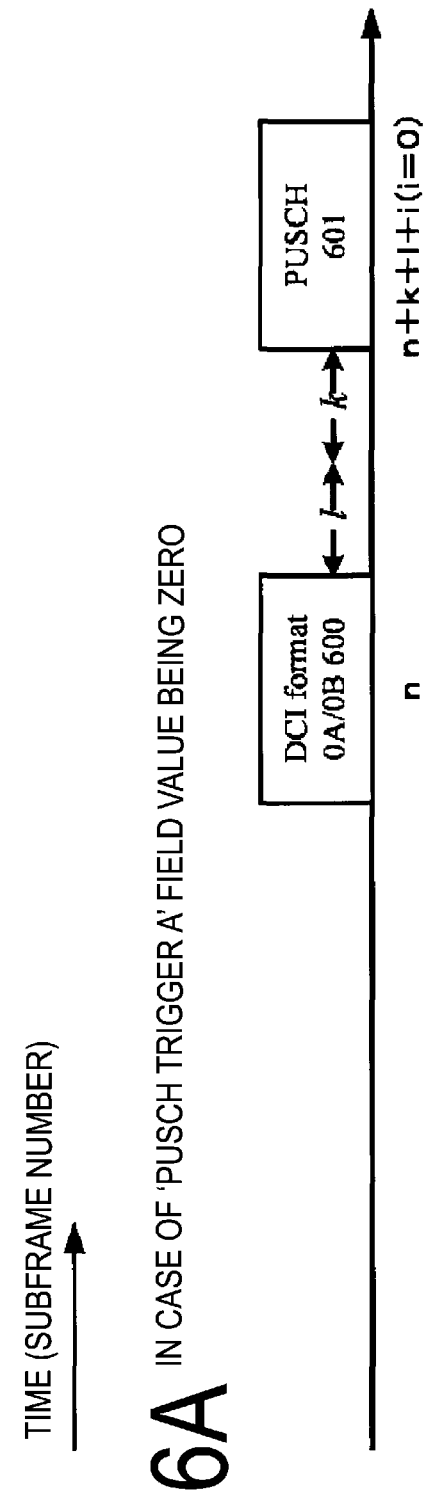
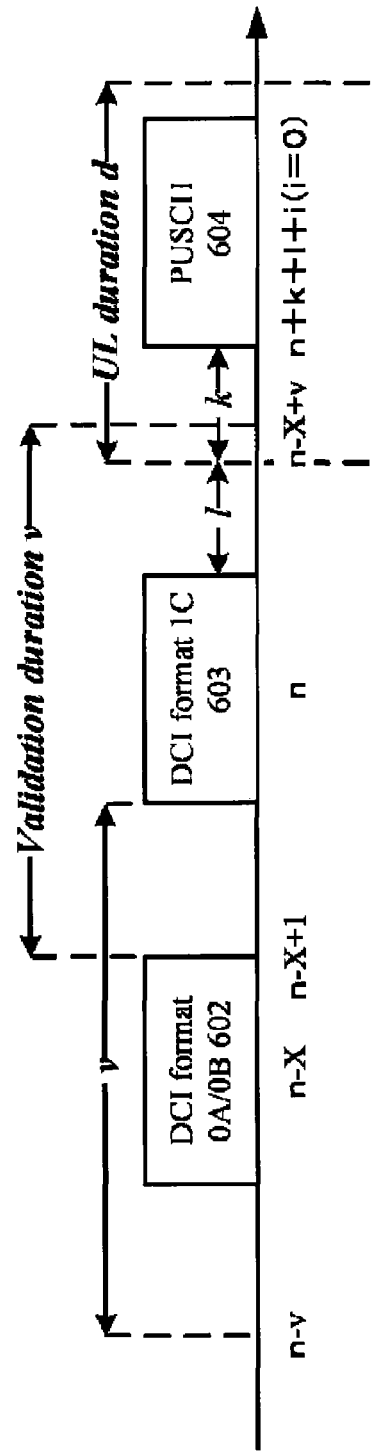
FIG. 6A IN CASE OF 'PUSCH TRIGGER A' FIELD VALUE BEING ZERO
FIG. 6B IN CASE OF 'PUSCH TRIGGER A' FIELD VALUE BEING ONE

TERMINAL APPARATUS, COMMUNICATION METHOD, AND INTEGRATED CIRCUIT

TECHNICAL FIELD

The present invention relates to a terminal apparatus, a communication method, and an integrated circuit.

This application claims priority based on JP 2016-199805 filed on Oct. 11, 2016 and submitted to Japan Patent Office, the contents of which are incorporated herein by reference.

BACKGROUND ART

A radio access method and a radio network for cellular mobile communications (hereinafter, referred to as "Long Term Evolution (LTE: Registered Trademark)", or "Evolved Universal Terrestrial Radio Access (EUTRA)") have been studied in the 3rd Generation Partnership Project (3GPP). In LTE, a base station apparatus is referred also to as an evolved NodeB (eNodeB), and a terminal apparatus is referred also to as a User Equipment (UE). LTE is a cellular communication system in which multiple areas are deployed in a cellular structure, with each of the multiple areas being covered by a base station apparatus. A single base station apparatus may manage a plurality of cells.

In LTE Release 13, carrier aggregation—a technology allowing a terminal apparatus to perform transmission and/or reception simultaneously in a plurality of serving cells (component carriers)—has been specified (NPLs 1, 2, and 3). In LTE Release 14, a certain type of carrier aggregation has been studied which uses Licensed Assisted Access (LAA) function enhancement and uplink carrier in an unlicensed band (NPL 4). A PRACH transmission (preamble transmission) using the uplink carrier in an unlicensed band has also been studied. Studies of Listen Before Talk (LBT) before the random access transmission is also necessary. Uplink LBT procedures of different types affect random access transmission.

CITATION LIST

Non Patent Literature

NPL 1: "3GPP TS 36.211 V13.1.0 (2016 March)", 29 Mar. 2016.
NPL 2: "3GPP TS 36.212 V13.1.0 (2016 March)", 29 Mar. 2016.
NPL 3: "3GPP TS 36.213 V13.1.1 (2016 March)", 31 Mar. 2016.
NPL 4: "New Work Item on enhanced LAA for LTE", RP-152272, Ericsson, Huawei, 3GPP TSG RAN Meeting #70, Sitges, Spain, 7 to 10 Dec. 2015.

SUMMARY OF INVENTION

Technical Problem

An aspect of the present invention provides: a terminal apparatus capable of performing efficient random access transmission; a communication method used for the terminal apparatus; an integrated circuit implemented in the terminal apparatus; a base station apparatus capable of performing efficient reception of random access transmission; a communication method used for the base station apparatus; and an integrated circuit implemented in the base station apparatus.

Solution to Problem (1) According to some aspects of the present invention, the following measures are provided. A first aspect of the present invention provides a terminal apparatus including: a reception processing unit configured to receive a PDCCH including a DCI format 1C to which CRC parity bits scrambled with a CC-RNTI are added; a channel measurement unit configured to perform an uplink LBT; and a transmission processing unit configured to transmit a preamble in an LAA cell. In the terminal apparatus, a type of an uplink LBT procedure for a PRACH transmission is determined based on whether or not a PRACH resource to be used for the PRACH transmission is included at least in a subframe in an uplink duration in which no downlink physical channel is received. In addition, a value of the uplink duration is given based at least on an 'Uplink transmission duration and offset indication' field included in the DCI format 1C.

(2) A second aspect of the present invention provides a base station apparatus configured to communicate with a terminal apparatus. The base station apparatus includes: a transmission processing unit configured to transmit a PDCCH including a DCI format 1C to which CRC parity bits scrambled with a CC-RNTI are added; and a reception processing unit configured to receive a preamble in an LAA cell. In the base station apparatus, a type of an uplink LBT procedure for a PRACH transmission is determined based on whether or not a PRACH resource to be used for the PRACH transmission is included at least in a subframe in an uplink duration in which no downlink physical channel is received. In addition, a value of the uplink duration is given based at least on an 'Uplink transmission duration and offset indication' field included in the DCI format 1C.

(3) A third aspect of the present invention provides a communication method to be used for a terminal apparatus. The communication method includes: receiving a PDCCH including a DCI format 1C to which CRC parity bits scrambled with a CC-RNTI are added, and transmitting a preamble in an LAA cell. A type of an uplink LBT procedure for a PRACH transmission is determined based on whether or not a PRACH resource to be used for the PRACH transmission is at least included in a subframe in an uplink duration in which no downlink physical channel is received, and a value of the uplink duration is given based at least on an 'Uplink transmission duration and offset indication' field included in the DCI format 1C.

(4) A fourth aspect of the present invention provides a communication method to be used for a base station apparatus configured to communicate with a terminal apparatus. The communication method includes: transmitting a PDCCH including a DCI format 1C to which CRC parity bits scrambled with a CC-RNTI are added, and receiving a preamble in an LAA cell. A type of an uplink LBT procedure for a PRACH transmission is determined based on whether or not a PRACH resource to be used for the PRACH transmission is at least included in a subframe in an uplink duration in which no downlink physical channel is received, and a value of the uplink duration is given based at least on an 'Uplink transmission duration and offset indication' field included in the DCI format 1C.

(5) A fifth aspect of the present invention provides an integrated circuit implemented in a terminal apparatus. The integrated circuit includes: a reception processing circuit configured to receive a PDCCH including a DCI format 1C to which CRC parity bits scrambled with a CC-RNTI are added; a channel measurement circuit configured to perform an uplink LBT; and a transmission processing circuit configured to transmit a preamble in an LAA cell. In the integrated circuit, a type of an uplink LBT procedure for a PRACH transmission is determined based on whether or not a PRACH resource to be used for the PRACH transmission is included at least in a subframe in an uplink duration in which no downlink physical channel is received. In addition, a value of the uplink duration is given based at least on an 'Uplink transmission duration and offset indication' field included in the DCI format 1C.

(6) A sixth aspect of the present invention provides an integrated circuit implemented in a base station apparatus. The integrated circuit includes: a transmission processing circuit configured to transmit a PDCCH including a DCI format 1C to which CRC parity bits scrambled with a CC-RNTI are added; and a reception processing circuit configured to receive a preamble in an LAA cell. In the integrated circuit, a type of an uplink LBT procedure for a PRACH transmission is determined based on whether or not a PRACH resource to be used for the PRACH transmission is included at least in a subframe in an uplink duration in which no downlink physical channel is received. In addition, a value of the uplink duration is given based at least on an 'Uplink transmission duration and offset indication' field included in the DCI format 1C.

Advantageous Effects of Invention

According to an aspect of the present invention, the terminal apparatus can perform PRACH transmission efficiently.

BRIEF DESCRIPTION OF DRAWINGS

FIGS. 6A and 6B are diagrams, each illustrating an example of a PUSCH scheduling in the present embodiment.

DESCRIPTION OF EMBODIMENTS

Embodiments of the present invention will be described below.

Figure 1:
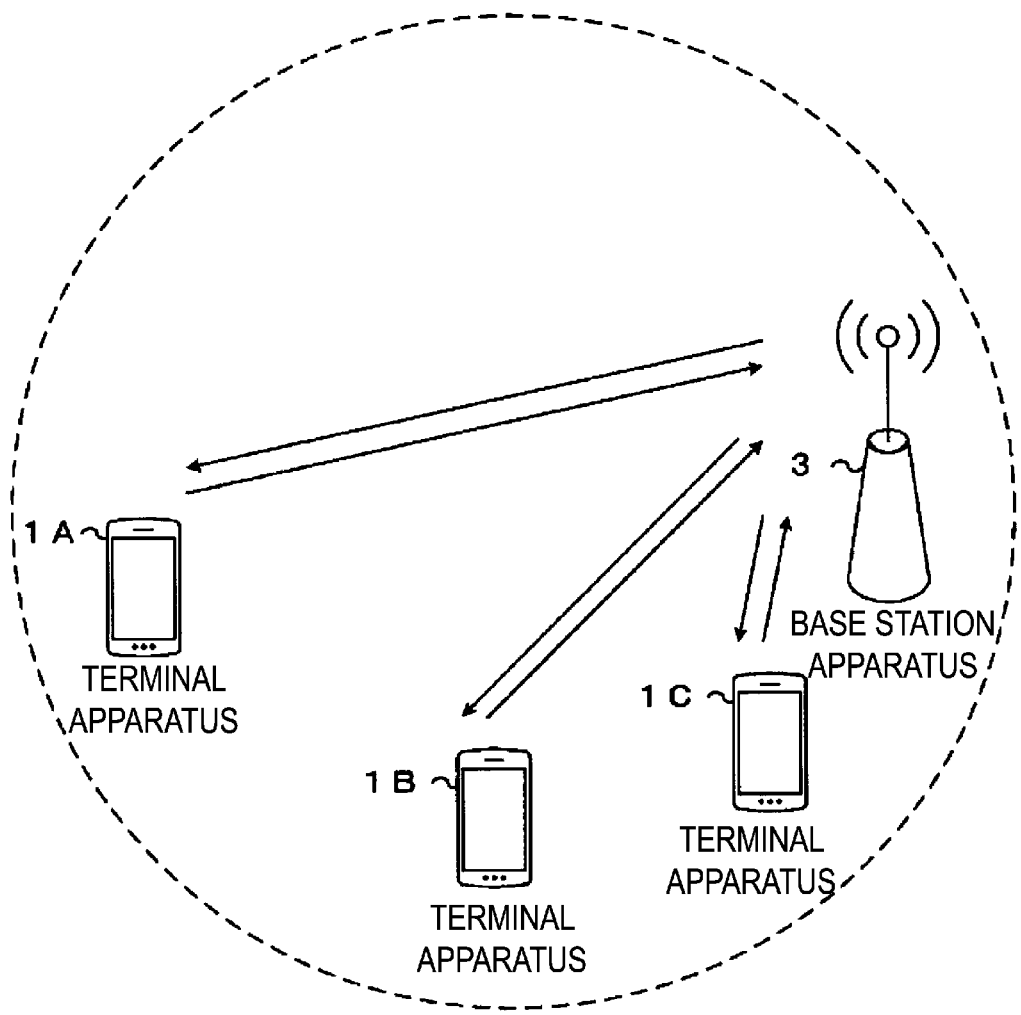
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. The terminal apparatuses 1A to 1C are each referred to as a terminal apparatus 1.

The base station apparatus 3 manages a cell, which corresponds to an area where terminal apparatuses 1 can communicate with the base station apparatus 3, for each frequency. A single base station apparatus 3 may manage multiple cells. Cells are classified into multiple types of cells depending on the size of the area (cell size) that allows for communication with terminal apparatuses 1. For example, cells are classified into macro cells and small cells. Moreover, small cells are classified into femto cells, pico cells, and nano cells depending on the size of the area. In a case that a terminal apparatus 1 can communicate with a certain base station apparatus 3, the cell configured so as to be used for the communication with the terminal apparatus 1 is referred to as "Serving cell" while the other cells not used for the communication are referred to as "Neighboring cell", among the cells of the base station apparatus 3.

Hereinafter, carrier aggregation will be described.

According to the present embodiment, a plurality of Serving cells are configured for the terminal apparatus 1. A technology in which the terminal apparatus 1 communicates via the plurality of Serving cells is referred to as cell aggregation or carrier aggregation. An aspect of the present invention may be applied to each of the plurality of Serving cells configured for the terminal apparatus 1. Furthermore, an aspect of the present invention may be applied to some of the plurality of Serving cells configured. Furthermore, an aspect of the present invention may be applied to each of the groups of the plurality of Serving cells configured. Furthermore, an aspect of the present invention may be applied to some of the groups of the plurality of Serving cells configured. The plurality of Serving cells includes at least one primary cell. The plurality of Serving cells may include one or more secondary cells. The plurality of Serving cells may include one or more Licensed Assisted Access (LAA) cells. The LAA cell is referred also to as the "LAA secondary cell."

The primary cell is a Serving cell in which an initial connection establishment procedure has been performed, a Serving cell in which a connection re-establishment procedure has been started, or a cell indicated as a primary cell in a handover procedure. The secondary cell and/or the LAA cell may be configured at a point of time when or after a Radio Resource Control (RRC) connection is established. The primary cell may be included in a licensed band. The LAA cell may be included in an unlicensed band. The secondary cell may be included in any of a licensed band and an unlicensed band. Note that the LAA cell may be configured as a primary cell. Alternatively, the LAA cell may be configured as a secondary cell.

A carrier corresponding to a Serving cell in the downlink is referred to as a downlink component carrier. A carrier corresponding to a Serving cell in the uplink is referred to as an uplink component carrier. The downlink component carrier and the uplink component carrier are collectively referred to as a component carrier.

The terminal apparatus 1 can perform simultaneous transmission and/or reception on a plurality of physical channels in a plurality of Serving cells (component carriers). A single physical channel is transmitted in a single Serving cell (component carrier) out of the plurality of Serving cells (component carriers).

A basic configuration (architecture) of dual connectivity will be described below. The following description is based on an exemplar case where the terminal apparatus 1 is connected simultaneously with a plurality of base station apparatuses 3. For example, one of the base station apparatuses 3 is a base station apparatus constituting a macro cell, and a different one of the base station apparatus 3 is a base station apparatus constituting a small cell. The terminal apparatus 1 connecting to the base station apparatuses 3 at the same time by using the plurality of cells belonging to the plurality of base station apparatuses 3 as described above is referred to as "dual connectivity." The cells belonging to the respective base station apparatuses 3 may be operated at the same frequency or different frequencies.

In dual connectivity, a base station apparatus 3 that acts as the mobility anchor of the core network is referred to as a "master base station apparatus (MeNB: Master eNB)." Moreover, a base station apparatus 3 that is not the master base station apparatus and that provides supplemental radio resources to the terminal apparatus 1 is referred to as "secondary base station apparatus (SeNB: Secondary eNB)." A group of Serving cells that is associated with the master base station apparatus may be referred to as "MasterCell Group (MCG)," and a group of Serving cells that is associated with the secondary base station apparatus may be referred to as "Secondary Cell Group (SCG)." Note that the cell groups may be Serving cell groups.

In dual connectivity, the primary cell belongs to the MCG. Moreover, in the SCG, the secondary cell corresponding to the primary cell is referred to as "Primary Secondary Cell (pSCell)." Note that the PSCell may be referred to as "special cell" or "Special Secondary Cell (Special SCell)." Some of the functions (for example, functions for transmitting and/or receiving a PUCCH) of the PCell (the base station apparatus constituting the PCell) may be supported by the Special SCell (the base station apparatus constituting the Special SCell). Additionally, some of the functions of the PCell may be supported in the pSCell. For example, the function for transmitting a PDCCH may be supported by the pSCell. Additionally, the function for performing a PDCCH transmission may be supported in the pSCell by using a search space different from a Common Search Space (CSS) or a UE-specific Search Space (USS). For example, the search space different from the USS is a search space determined based on a value defined in the specification, a search space determined based on an RNTI different from the C-RNTI, a search space determined based on a value configured by the higher layer that is different from the RNTI, or the like. Moreover, the pSCell may constantly be in a starting state. Moreover, the pSCell is a cell capable of receiving the PUCCH. In the dual connectivity, the LAA cell may be configured as a primary cell that belongs to the MCG. Alternatively, in the dual connectivity, the LAA cell may be configured as a secondary cell that belongs to the MCG. Further alternatively, in the dual connectivity, the LAA cell may be configured as a Primary secondary cell that belongs to the SCG. Further alternatively, in the dual connectivity, the LAA cell may be configured as a secondary cell that belongs to the SCG.

Note that the carrier aggregation is different from the dual connectivity in that a single one of the base station apparatuses 3 manages multiple cells and the frequencies of the individual cells are different from each other. In other words, the carrier aggregation is a technique for connecting the single terminal apparatus 1 and a single one of the base station apparatus 3 via a plurality of cells having different frequencies, while dual connectivity is a technique for connecting the single terminal apparatus 1 and the plurality of base station apparatuses 3 via a plurality of cells having the same frequency or different frequencies. In addition, the carrier aggregation may be applied to each of the MCG and the SCG.

The LAA cell may be aggregated (assisted) by the primary cell and/or the secondary cell by dual connectivity.

Details of the LAA cell and those of the LBT will be described below.

The frequency used by the LAA cell is shared with other communication systems and/or other LTE operators. To share the frequency, the LAA cell needs fairness with the other communication systems and/or the other LTE operators. For example, a communication method used by the LAA cell needs a fair frequency sharing technique (method). In other words, the LAA cell is a cell which performs a communication method (communication procedure) to which the fair frequency sharing technique is applicable (used).

An example of the fair frequency sharing technique is Listen-Before-Talk (LBT). The LBT includes a procedure where before a certain base station apparatus 3 or a certain terminal apparatus 1 transmits a signal by using a frequency (a component carrier, a carrier, a cell, a channel, or a medium), the certain base station apparatus 3 or the certain terminal apparatus 1 measures (detects) interference power (an interference signal, receive power, a receive signal, noise power and a noise signal) or the like of the frequency to discern (detect, assume or determine) whether the frequency is in an idle state (a free state, a non-congested state, Absence or Clear) or a busy state (an occupied state, a congested state, Presence or Occupied). In a case where based on the LBT, it is discerned that the certain frequency is in the idle state, the certain base station apparatus 3 or the certain terminal apparatus 1 can transmit a signal at a prescribed timing of the frequency of the LAA cell. In a case where it is discerned that the frequency is in the busy state, the certain base station apparatus 3 or the certain terminal apparatus 1 does not transmit a signal at the prescribed timing of the frequency of the LAA cell. LBT enables control preventing the signal transmitted by a certain base station apparatus 3 or a certain terminal apparatus 1 from interfering with signals to be transmitted by other base stations and/or terminals including other communication systems and/or other LTE operators. Note that LBT performed by the base station apparatus 3 before a downlink transmission is referred to as downlink LBT and that LBT performed by the terminal apparatus 1 before an uplink transmission is referred to as uplink LBT. Furthermore, LBT performed by the terminal apparatus 1 for sidelink transmissions may be referred to as sidelink LBT. The LBT may be Clear Channel Assessment (CCA). The LBT may be channel sensing. The LBT may be referred also to as the "Channel access (carrier sense)."

In the LBT, whether a particular frequency is idle or busy may be determined based on whether the interference power at the particular frequency exceeds a certain threshold value or not. Alternatively, in the LBT, whether a particular frequency is idle or busy may be determined based on whether the receive power of a prescribed signal or channel at the particular frequency exceeds a certain threshold value or not. In addition, in the LBT, the threshold value may be determined in advance. Alternatively, in the LBT, the threshold value may be set from the base station or from another terminal apparatus. Further alternatively, in the LBT, the threshold value may be determined (set) based at least on another value (parameter) such as the transmit power (maximum transmit power). Further alternatively, in the LBT, whether a particular frequency is idle or busy may be determined based on whether a prescribed channel at the particular frequency has been decoded successfully or not.

The downlink LBT includes a procedure where the base station apparatus 3 performs one or more LBTs. The uplink LBT, on the other hand, includes a procedure where the terminal apparatus 1 performs one or more LBTs. The downlink LBT includes a procedure where the LBT procedure is started in a case where there is information that can be transmitted on the downlink (data, buffer, load, traffic). The uplink LBT, on the other hand, may include a procedure where the LBT procedure is started in a case where the base station apparatus 3 has issued an instruction to perform uplink transmission (i.e., in a case where an uplink grant has been received).

The uplink LBT procedure has at least two different types (LBT Types): Type 1 (channel access Type 1); and Type 2 (channel access Type 2). The uplink LBT procedure of Type 1 may include the LBT category 4. The uplink LBT procedure of Type 2 may include a 25-μs CCA (LBT category 2).

The uplink LBT procedure of Type 1 includes a procedure where in a case where the terminal apparatus 1 performs first sensing (a single CCA) and consequently determines that the channel is idle, then the terminal apparatus 1 performs the LBT a prescribed number (N) of times indicated by a counter.

Specifically, in the first sensing, the terminal apparatus 1 performs the channel sensing in a slot duration within a defer duration, and thus senses whether there is a different signal. In a case where the terminal apparatus 1 determines that the channel is idle as a result of the first sensing, the terminal apparatus 1 may perform the following processes.

(i) The terminal apparatus 1 generates randomly a counter value N based on a contention window value.

(ii) In a case where the counter value is not zero, the terminal apparatus 1 decrements the counter value N by 1 as "N=N−1."

(iii) The terminal apparatus 1 performs the LBT in a single slot duration, and thus determines whether the channel is idle or busy. In a case where the terminal apparatus 1 determines that the channel is idle, the process (iv) will be performed next. In a case where the terminal apparatus 1 determines that the channel is busy, the process (v) will be performed next.

(iv) In a case where the counter value N becomes zero, the terminal apparatus 1 may obtain the right to access the channel and may perform uplink transmission through the channel. In a case where the counter value N is not zero, the terminal apparatus 1 will return back to the process (ii).

(v) The terminal apparatus 1 performs the channel sensing in all the slot durations included in a single defer duration, and thus determines whether the channels are idle or busy.

In a case where in the process (v) the terminal apparatus 1 determines, based on the channel sensing, that the channels in all the slot durations included in the single defer duration are idle, the terminal apparatus 1 will performs the process (iv) next. In a case where the terminal apparatus 1 determines, based on the channel sensing, that the channel in at least one of the slot durations included in the single defer duration is busy, the terminal apparatus 1 will perform again the process (v).

Note that the slot duration $T_{s1}$ may range from 9 μs to 9 μs+$T_s$. The defer duration $T_d$ is defined as $T_f$+$m_p$×$T_{s1}$. For example, the $T_f$ may range from 16 μs to 16 μs+$T_s$. The value of $m_p$ is determined based on the channel access priority class. The channel access priority class may be notified of by the uplink grant. Alternatively, the channel access priority class may be notified of by the RRC signalling. Note that the $T_s$ is a basic time unit, specifically, 1/(15000×2048) sec.

In the uplink LBT procedure of Type 2, whether the channel is idle or busy is determined based on the LBT performed at least one sensing interval. In a case where the terminal apparatus 1 determines that the channel is idle in the sensing interval, the terminal apparatus 1 may obtain the right to access the channel and may thus perform uplink transmission through the channel. Alternatively, in a case where the terminal apparatus 1 determines that the channel is busy in the sensing interval, the terminal apparatus 1 does neither have to obtain the right to access the channel nor to perform uplink transmission through the channel. Note that the sensing interval may be 25 μs.

Next, physical channels and physical signals according to the present embodiment will be described.

In FIG. 1, in uplink radio communication (uplink transmission) from the terminal apparatus 1 to the base station apparatus 3, the following uplink physical channels are used. The uplink physical channels are used for transmitting information output from a higher layer.

Physical Uplink Shared Channel (PUSCH)
Physical Random Access Channel (PRACH)
Physical Uplink Control Channel (PUCCH)

The PUCCH is used for transmitting uplink data (Transport block, Uplink-Shared Channel: UL-SCH), CSI (Channel State Information) of downlink, and/or, HARQ-ACK (Hybrid Automatic Repeat reQuest). The CSI, as well as the HARQ-ACK, is Uplink Control Information (UCI).

The CSI includes a Channel Quality Indicator (CQI), a Rank Indicator (RI), and a Precoding Matrix Indicator (PMI). The CQI expresses a combination of a modulation scheme and a coding rate for a single transport block to be transmitted on the PDSCH. The RI represents the number of effective layers determined by the terminal apparatus 1. The PMI represents a code book determined by the terminal apparatus 1. The code book is associated with the precoding of the PDSCH.

The HARQ-ACK corresponds to downlink data (Transport block, Medium Access Control Protocol Data Unit (MAC PDU), Downlink-Shared Channel (DL-SCH), Physical Downlink Shared Channel: PDSCH). The HARQ-ACK indicates an acknowledgement (ACK) or a negative-acknowledgement (NACK). The HARQ-ACK is referred also to as ACK/NACK, HARQ feedback, HARQ response, HARQ information, or HARQ control information.

The PRACH is used to transmit a preamble to be used for a random access (random access preamble). The PRACH is used for indicating the initial connection establishment procedure, the handover procedure, the connection re-establishment procedure, synchronization (timing adjustment) for uplink transmission, and the request for the PUSCH (UL-SCH) resource. The PRACH is used by the terminal apparatus 1 to access the base station apparatus 3 (or a cell).

The PUCCH is used to transmit Uplink Control Information (UCI). Here, the Uplink Control Information may include Channel State Information (CSI) for the downlink. The Uplink Control Information may include a Scheduling Request (SR) used to request a UL-SCH resource. The Uplink Control Information may include Hybrid Automatic Repeat request ACKnowledgment (HARQ-ACK).

In FIG. 1, the following uplink physical signal is used in the uplink radio communication. Here, the uplink physical signal is not used to transmit information output from the higher layers but is used by the physical layer.

Uplink Reference Signal (UL RS)

According to the present embodiment, the following two types of Uplink Reference Signals are used.

Demodulation Reference Signal (DMRS)
Sounding Reference Signal (SRS)

The DMRS is associated with transmission of the PUSCH or the PUCCH. The DMRS is time-multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station apparatus 3 may use the SRS to measure the channel state. The SRS is transmitted as the last SC-FDMA symbol in the uplink subframe or as the SC-FDMA symbol in the UpPTS.

In FIG. 1, the following downlink physical channels are used for downlink radio communication (downlink transmission) from the base station apparatus 3 to the terminal apparatus 1. The downlink physical channels are used for transmitting information output from the higher layer.

Physical Downlink Control Channel (PDCCH)
Physical Downlink Shared Channel (PDSCH)

The PDSCH is used to transmit downlink data (Transport block, Downlink-Shared Channel (DL-SCH)).

The PDCCH is used to transmit Downlink Control Information (DCI). The Downlink Control Information is referred also to as DCI format. The Downlink Control Information includes an uplink grant and a downlink grant. The uplink grant may be used for scheduling a single PUSCH within a single cell. The uplink grant may be used for scheduling a plurality of PUSCHs in a plurality of consecutive subframes within a single cell. The uplink grant may be used for scheduling of a single PUSCH within the fourth or later subframe from the subframe in which the uplink grant is transmitted. The downlink grant may be used for scheduling a single PDSCH within a single cell. The downlink grant is referred also to as "downlink assignment."

The DCI format 0A may be used for scheduling the PUSCH in the LAA cell. The DCI format 0B may be used for scheduling the PUSCH in each of the plurality of subframes in the LAA cell. Each of the DCI format 0A and the DCI format 0B includes the uplink grant. Each of the DCI format 0A and the DCI format 0B may include a 'PUSCH trigger A' field and a 'Timing offset' field. Each of the DCI format 0A and the DCI format 0B may include PUSCH scheduling information. The PUSCH scheduling information may include: information indicating the resource block allocation for PUSCH; transmit power control command for PUSCH; information indicating the modulation scheme for PUSCH; and information indicating the transport block size for PUSCH.

The DCI format 1A may be used for scheduling the PDSCH in the LAA cell. The DCI format 1A includes the downlink grant.

The DCI format 1C is used for the LAA common information. The LAA common information may include an 'Uplink transmission duration and offset indication' and/or a 'PUSCH trigger B'. The DCI format 1C includes no information for scheduling the PUSCH.

The Cyclic Redundancy Check (CRC) parity bits attached to the downlink control information transmitted by a single PDCCH may be scrambled with a Cell Radio Network Temporary Identifier (C-RNTI), a Temporary C-RNTI, a Random Access Radio Network Temporary Identifier (RA-RNTI), or a Common Control Radio Network Temporary Identifier (CC-RNTI).

The C-RNTI is an identifier for identifying a terminal apparatus within a cell. The C-RNTI is used to control the PDSCH transmission or the PUSCH transmission in a single subframe. The C-RNTI is used for unicast transmission (PDSCH transmission or PUSCH transmission) scheduled dynamically. The base station apparatus 3 may transmit, to the terminal apparatus 1, the information to be used for the C-RNTI determination in the terminal apparatus 1. The CRC parity bits to be attached to the DCI format (e.g., the DCI format 0A, the DCI format 0B, the DCI format 1A, etc.) including the uplink grant or the downlink grant may be scrambled with the C-RNTI.

The temporary C-RNTI is used during a contention based random access procedure. The Temporary C-RNTI is used to control PDSCH transmission or PUSCH transmission in a single subframe.

The RA-RNTI is used during a contention based random access procedure. The RA-RNTI is used to control the PDSCH transmission in a single subframe.

The CC-RNTI is used for the LAA common information. The value of the CC-RNTI may be a value that has been determined in advance in the specifications or the like. The CRC parity bits to be attached to the DCI format 1C to be used for the LAA common information may be scrambled with the CC-RNTI.

The UL-SCH and the DL-SCH are transport channels. A channel used in a Medium Access Control (MAC) layer is referred to as a transport channel. A unit of the transport channel used in the MAC layer is referred also to as a transport block (TB) or a MAC Protocol Data Unit (PDU).

An asynchronous HARQ may be applied to the PUSCH (UL-SCH) of the present embodiment.

In FIG. 1, the following downlink physical signals are used for downlink radio communication. Here, the downlink physical signals are not used to transmit the information output from the higher layers but is used by the physical layer.

Synchronization Signal (SS)
Downlink Reference Signal (DL RS)

The synchronization signal is used for the terminal apparatus 1 to take synchronization in the frequency domain and the time domain in the downlink.

The Downlink Reference Signal is used for the terminal apparatus 1 to perform channel compensation on a downlink physical channel. The Downlink Reference Signal is used in order for the terminal apparatus 1 to obtain the downlink channel state information.

A configuration of the radio frame according to the present embodiment will be described below.

Figure 2:
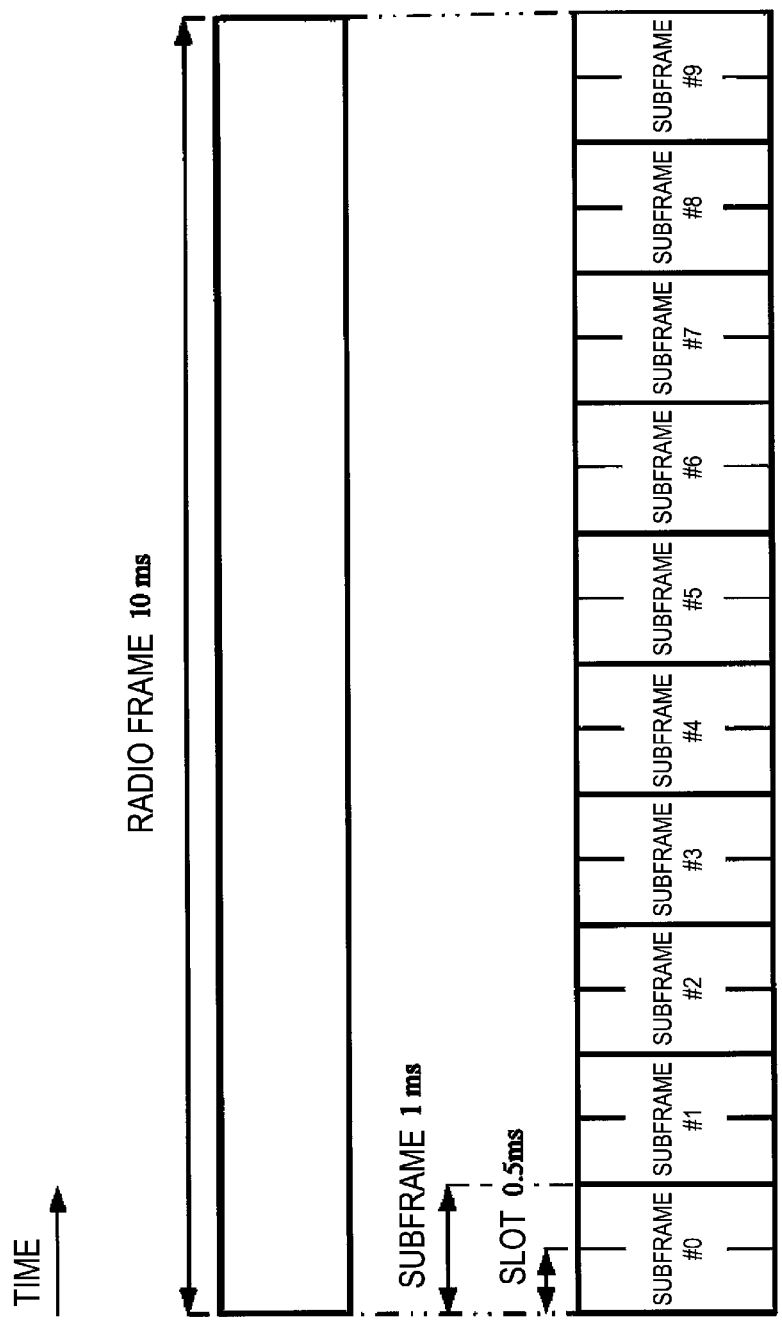
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis. Each of the radio frames is 10 ms in length. In addition, each of the radio frames is constituted of 10 subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot. To be more precise, 10 subframes are available in each 10-ms spacing.

Figure 3:
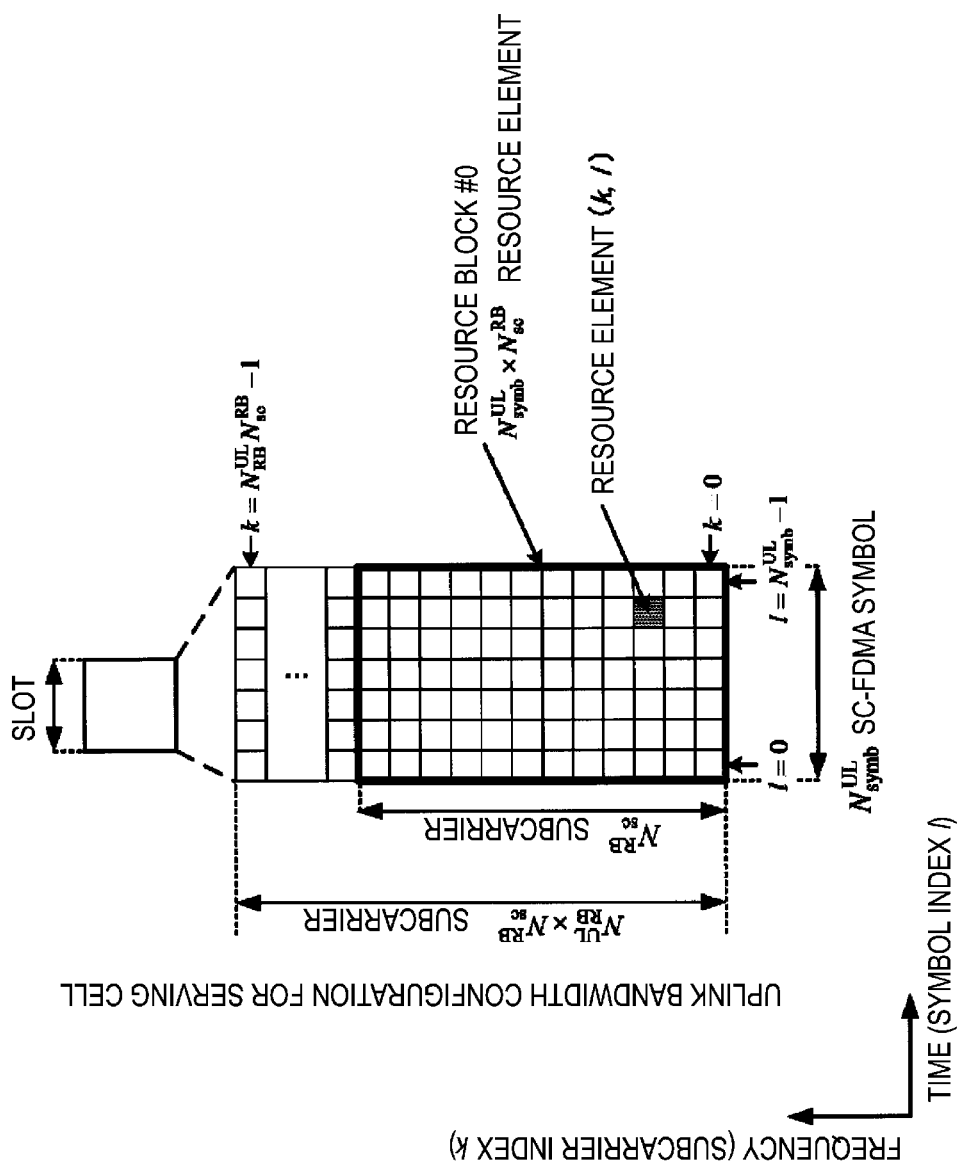
FIG. 3 is a diagram illustrating a schematic configuration of an uplink slot according to the present embodiment.

An example configuration of a slot according to the present embodiment will be described below. FIG. 3 is a diagram illustrating a schematic configuration of an uplink slot according to the present embodiment. FIG. 3 illustrates a configuration of an uplink slot in a cell. In FIG. 3, the horizontal axis is a time axis, and the vertical axis is a frequency axis. In FIG. 3, the letter l is an SC-FDMA symbol number/index, and the letter k is a subcarrier number/index.

The physical signal or the physical channel transmitted in each of the slots is expressed by a resource grid. In uplink, the resource grid is defined by multiple subcarriers and multiple SC-FDMA symbols. Each element within the resource grid is referred to as a resource element. The resource element is expressed by a subcarrier number/index k and an SC-FDMA symbol number/index 1.

The uplink slot includes multiple SC-FDMA symbols 1 (l=0, 1, ..., $N^{UL}_{symb}$) in the time domain. $N^{UL}_{symb}$ indicates the number of SC-FDMA symbols included in one uplink slot. For a normal Cyclic Prefix (CP) in the uplink, $N^{UL}_{symb}$ is 7. For an extended CP in the uplink, $N^{UL}_{symb}$ is 6.

The terminal apparatus 1 receives, from the base station apparatus 3, the parameter UL-CyclicPrefixLength indicating the CP length in the uplink. The base station apparatus 3 may broadcast, in the cell, system information including the parameter UL-CyclicPrefixLength corresponding to the cell.

The uplink slot includes the plurality of subcarriers k (k=0, 1, ..., $N^{UL}_{RB} \times N^{RB}_{SC}$) in the frequency domain. $N^{UL}_{RB}$ is an uplink bandwidth configuration for the Serving cell expressed by a multiple of $N^{RB}_{SC}$. $N^{RB}_{SC}$ is the (physical) resource block size in the frequency domain expressed by the number of subcarriers. The subcarrier spacing Δf is 15 kHz, and $N^{RB}_{SC}$ may be 12. Hence, the $N^{RB}_{SC}$ may be 180 kHz. The subcarrier spacing Δf may be any other frequencies than 15 kHz. For example, the subcarrier spacing may be any of 3.75 kHz, 7.5 kHz, 15 kHz, 30 kHz, 60 kHz, 120 kHz, and 240 kHz.

A resource block (RB) is used to express mapping of a physical channel to resource elements. For the resource block, a virtual resource block (VRB) and a physical resource block (PRB) are defined. A physical channel is first mapped to a virtual resource block. Then, the virtual resource block is mapped to the physical resource block. One physical resource block is defined by $N^{UL}_{symb}$ consecutive SC-FDMA symbols in the time domain and by $N^{RB}_{SC}$ consecutive subcarriers in the frequency domain. Hence, one physical resource block is constituted of ($N^{UL}_{symb} \times N^{RB}_{SC}$) resource elements. One physical resource block corresponds to one slot in the time domain. The physical resource blocks are numbered $n^{PRB}$ (0, 1, ..., $N^{UL}_{RB}-1$) in ascending order of frequencies in the frequency domain.

The downlink slot according to the present embodiment includes a plurality of OFDM symbols. The configuration of the downlink slot according to the present embodiment is basically the same as the configuration of the uplink slot except that the resource grid is defined by multiple subcarriers and multiple OFDM symbols. Hence, no more description will be given below about the configuration of the downlink slot.

Configurations of apparatuses according to the present embodiment will be described below.

Figure 4:
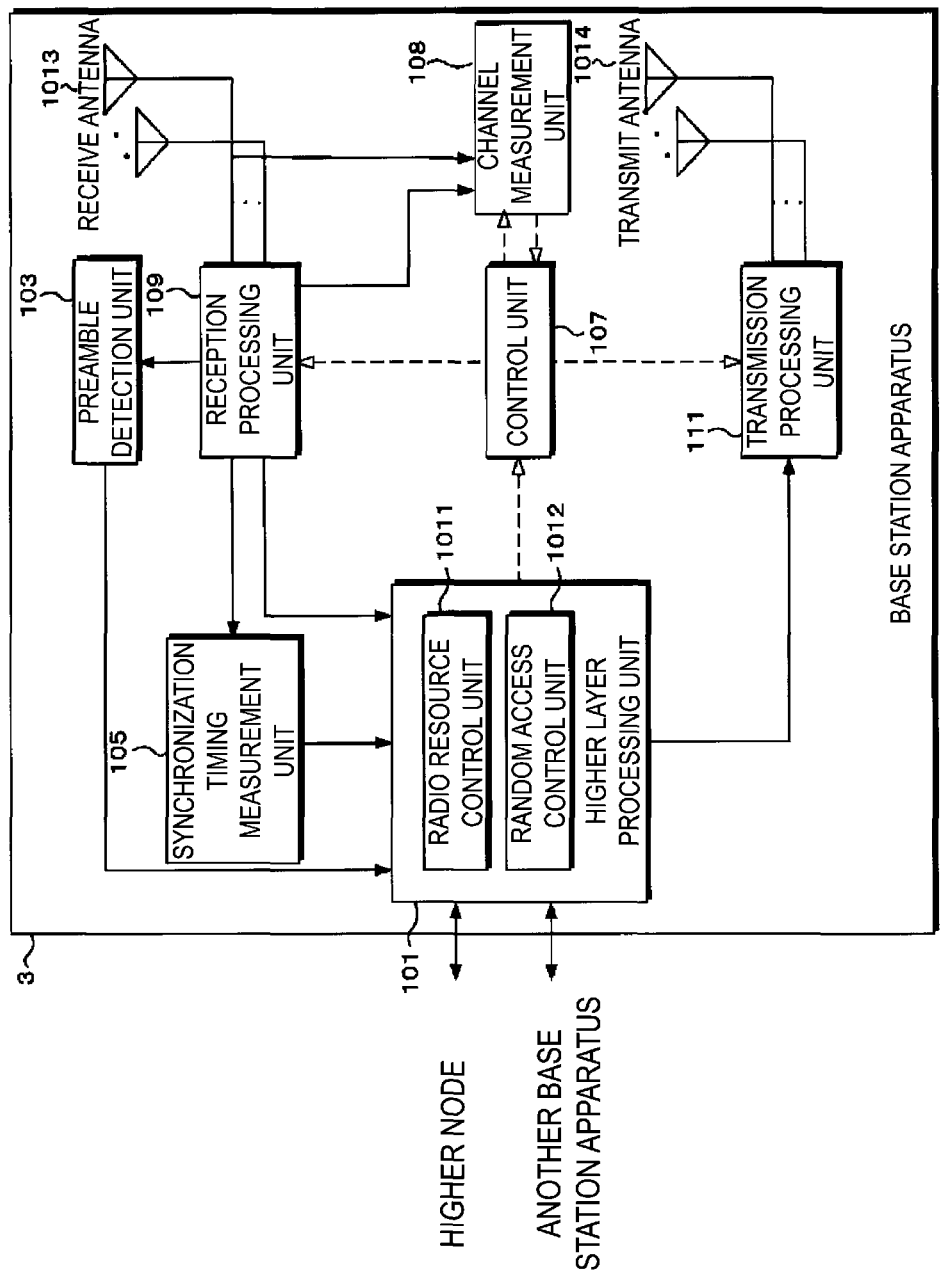
FIG. 4 is a schematic block diagram illustrating a configuration of a base station apparatus 3 according to the present embodiment.

FIG. 4 is a schematic block diagram illustrating a configuration of a base station apparatus 3 according to the present embodiment. As illustrated in FIG. 4, the base station apparatus 3 includes a higher layer processing unit 101, a preamble detection unit 103, a synchronization timing measurement unit 105, a control unit 107, a channel measurement unit 108, a reception processing unit 109, a plurality of receive antennas 1013, a transmission processing unit 111, and a plurality of transmit antennas 1014. The higher layer processing unit 101 includes a radio resource control unit 1011 and a random access control unit 1012. In FIG. 4, the receive antenna and the transmit antenna are illustrated as separate components, but a single antenna shared for the two purposes may be provided by use of a thyristor operable to switch the input and the output of signals.

The higher layer processing unit 101 outputs, to the transmission processing unit 111, data information for individual downlink component carriers. The higher layer processing unit 101 performs processing of the Packet Data Convergence Protocol (PDCP) layer, the Radio Link Control (RLC) layer, and the Radio Resource Control (RRC) layer. The radio resource control unit 1011 of the higher layer processing unit 101 manages various pieces of configuration information, the communication state and, the buffer state of each of the terminal apparatuses 1. The random access control unit 1012 of the higher layer processing unit 101 performs the control associated with the random access of each of the terminal apparatuses 1.

In the above-mentioned process, the radio resource control unit 1011 included in the higher layer processing unit 101 allocates multiple uplink component carriers and multiple downlink component carriers to the individual terminal apparatuses 1 in accordance with, among other things, the numbers of the downlink component carriers and of the uplink component carriers that can be used by the base station apparatus 3 for radio communications and the numbers of the downlink component carriers and of the uplink component carriers that each terminal apparatus 1 can transmit or receive simultaneously.

The radio resource control unit 1011 generates, or acquire from a higher node, the information mapped to each channel in each downlink component carrier, and outputs the information for each downlink component carrier to the transmission processing unit 111. For example, the radio resource control unit 1011 generates a random access response, which is a type of the downlink control information or of the data information, and outputs to the transmission processing unit 111.

The radio resource control unit 1011 selects, from the radio resources of the uplink component carrier allocated to the terminal apparatuses 1, some radio resources to which the terminal apparatuses 1 map the PUSCHPUSCH (data information) and allocates the radio resources to the terminal apparatuses 1. In addition, the radio resource control unit 1011 selects, from the radio resources of the downlink component carrier allocated to the terminal apparatuses 1, some radio resources to which the PDSCH (data information) is mapped, and allocates the radio resources. The radio resource control unit 1011 generates the downlink grant and the uplink grant indicating the allocation of the radio resources, and transmits the downlink grant and the uplink grant via the transmission processing unit 111 to the terminal apparatuses 1. The radio resource control unit 1011 makes the downlink grant and the uplink grant include C-RNTI allocated to the terminal apparatuses 1 corresponding to the downlink grant and to the uplink grant.

Based on the control information from the random access control unit 1012, the radio resource control unit 1011 generates the PDCCH instructing the start of the random access processing. Based on the channel quality of the downlink component carrier allocated to the terminal apparatus 1 to which the instruction to start the random access processing is issued and/or on the overhead of the PDCCH, the radio resource control unit 1011 selects any one of the downlink component carriers, and transmits, to the terminal apparatus 1 via the transmission processing unit 111, the PDCCH using the selected downlink component carrier to instruct the start of the random access processing. In addition, the radio resource control unit 1011 makes the PDCCH that instructs the start of the random access processing include the information indicating the radio resource of the PRACH corresponding to the downlink component carrier allocated to the terminal apparatus 1 corresponding the PDCCH; the information indicating the index number of the preamble; and the C-RNTI.

Based on the control information from the random access control unit 1012, the radio resource control unit 1011 selects a single downlink component carrier and allocates one of the radio resources in the selected downlink component carrier for providing a random access response. In addition, the radio resource control unit 1011 makes the downlink grant indicating the allocation of the radio resource include the RA-RNTI input from the random access control unit 1012.

Based on the control information from the random access control unit 1012, the radio resource control unit 1011 selects a single uplink component carrier and allocates one of the radio resources in the selected uplink component carrier for providing a message 3. In addition, the radio resource control unit 1011 generates an uplink grant indicating the allocation of the radio resource, makes the random access response include the generated uplink grant, and transmits the random access response to the terminal apparatus 1 via the transmission processing unit 111. Note that the uplink grant included in the random access response includes neither the cyclic redundancy check code nor the terminal apparatus identifier. The random access response includes: the amount of synchronization timing deviation and the Temporary C-RNTI for each of the multiple preambles input from the random access control unit 1012; and the uplink grant generated by the radio resource control unit 1011.

Based on the uplink control information (the ACK/NACK, the channel quality information, the scheduling request) notified of by the terminal apparatus 1 via the PUCCH, on the buffer state of the terminal apparatus 1, and on various kinds of configuration information of each terminal apparatus 1 set by the radio resource control unit 1011, the radio resource control unit 1011 generates control information to control the reception processing unit and the transmission processing unit, and outputs the generated control information to the control unit.

In the above-described processing, the random access control unit 1012 included in the higher layer processing unit 101 generates: a pair of uplink component carrier and downlink component carrier configured to transmit and/or receive some or entire part of the message; the configuration of the PRACH in the uplink component carrier (allocation of the radio resource of the PRACH); broadcast information including the information associated with the random access such as the information indicating the transmission state of random access (random access load); the random access response; the contention resolution; etc. The random access control unit 1012 outputs the control information to the radio resource control unit 1011 to make the transmission processing unit 111 transmit the above-mentioned generated information and the like to the terminal apparatus 1.

The random access control unit 1012 configures a PRACH corresponding to a particular downlink component carrier capable of staring the random access processing in each terminal apparatus 1 based on the random access transmission state, the channel quality of the uplink component carrier, and/or the like. The random access control unit 1012 generates information indicating the configured particular downlink component carrier, makes the radio resource control signal or the like include the generated information. The random access control unit 1012 outputs the control information to the radio resource control unit 1011 to make the transmission processing unit 111 transmit the radio resource control signal or the like to each of the terminal apparatuses 1.

In a case, for example, where there is data information to be transmitted to the terminal apparatus 1 but the base station apparatus 3 and the terminal apparatus 1 are not synchronized with each other, the random access control unit 1012 determines to instruct the terminal apparatus 1 to start the random access processing. The random access control unit allocates the radio resource of the PRACH and the preamble corresponding to the particular downlink component carrier configured in the terminal apparatus 1. The random access control unit 1012 outputs the control information to the radio resource control unit 1011 so as to generate a PDCCH instructing the terminal apparatus 1 to start the random access processing and to make the generated PDCCH to be output to the transmission processing unit 111.

Based on the PRACH information, the preamble number, and the amount of synchronization timing deviation all of which are input from the preamble detection unit 103, the random access control unit 1012 outputs the control information to the radio resource control unit 1011 so as to output the preamble number and the amount of synchronization timing deviation to the radio resource control unit 1011 and to make radio resource control unit 1011 generate the random access response. In addition, the random access control unit 1012 calculates the RA-RNTI based on the information on the PRACH detecting the preamble input from the preamble detection unit 103, and outputs the calculated RA-RNTI to the radio resource control unit 1011.

The random access control unit 1012 outputs the control information to the radio resource control unit 1011 so that the downlink component carrier paired with the uplink component carrier where the preamble has been detected is selected based on the information of PRACH detecting the preamble input from the preamble detection unit 103 and that the random access response is transmitted with the downlink component carrier. In addition, the random access control unit 1012 outputs the control information to the radio resource control unit 1011 so that the uplink component carrier where the preamble has been detected is selected and that the radio resource to be used for the transmission of the message 3 is allocated from radio resources of the selected uplink component carrier.

The random access control unit 1012 outputs the control information to the radio resource control unit 1011 so that the contention resolution is transmitted with the downlink component carrier to the terminal apparatus 3 to which the message 3 with the radio resource allocated by the random access response has been transmitted.

In accordance with the control information originating from the higher layer processing unit 101, the control unit 107 generates a control signal for control of the reception processing unit 109 and the transmission processing unit 111. The control unit 107 outputs the generated control signal to the reception processing unit 109 and the transmission processing unit 111 to control the reception processing unit 109 and the transmission processing unit 111.

In accordance with the control signal input from the control unit, the reception processing unit 109 demultiplexes, demodulates, and decodes the reception signal received from the terminal apparatus 1 through the receive antenna, and outputs information resulting from the decoding to the higher layer processing unit 101. In addition, the reception processing unit 109 outputs the demultiplexed uplink reference signal to the synchronization timing measurement unit 105, and the demultiplexed PRACH to the preamble detection unit 103.

Specifically, the reception processing unit 109 converts (down-converts) each uplink component carrier signal received through the corresponding receive antenna into a signal of an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The reception processing unit 109 removes a portion corresponding to the Guard Interval (GI) from the digital signal resulting from the conversion. The reception processing unit 109 performs Fast Fourier Transform (FFT) on the signal from which the Guard Interval has been removed, and extracts a signal in the frequency domain.

The reception processing unit 109 demultiplexes the extracted signals, for each uplink component carrier, into the signals mapped in the PRACH, the PUCCH, the PUSCH, the DMRS, and the SRS. The demultiplexing is performed based on the radio resource allocation information that is determined in advance by the base station apparatus 3 and that is notified to each of the terminal apparatuses 1. In addition, the reception processing unit 109 obtains the channel estimate from the demultiplexed uplink reference signal and thus performs the compensation of channel for the PUCCH and for the PUSCH.

The reception processing unit 109 outputs the demultiplexed PRACH to the preamble detection unit 103, and outputs the demultiplexed uplink reference signal to the synchronization timing measurement unit 105. The reception processing unit 109 performs Inverse Discrete Fourier Transform (IDFT) on PUSCH, acquires modulation symbols, and performs reception signal demodulation, that is, demodulates each of the modulation symbols on the PUCCH and the PUSCH, in compliance with the modulation scheme predetermined in advance, such as Binary Phase Shift Keying (BPSK), Quadrature Phase Shift Keying (QPSK), 16Quadrature Amplitude Modulation (16QAM), and 64Quadrature Amplitude Modulation (64QAM), or in compliance with the modulation scheme that the base station apparatus 3 has notified each terminal apparatus 1 of, in advance, with the uplink grant.

The reception processing unit 109 decodes the coded bits of the demodulated PUCCH and PUSCH, at the coding rate in compliance with a coding scheme prescribed in advance, the coding rate being prescribed in advance or being notified in advance with the uplink grant to the terminal apparatus 1 by the base station apparatus 3. The reception processing unit 109 then outputs the data information and uplink control information to the higher layer processing unit 101. The reception processing unit 109 measures, among other things, the electric power of the uplink reference signal received from the terminal apparatus 1 and the electric power of the PUSCH reception signal, and also measures the reception quality of the channel of the uplink component carrier. The measurement results are outputted to the higher layer processing unit 101.

The preamble detection unit 103 detects multiple preambles from the radio resources of the PRACH input from the reception processing unit 109, and calculates, from each preamble, the amount of synchronization timing deviation. The preamble detection unit 103 outputs, to the higher layer processing unit 101, the information on the PRACH detecting the preambles, the preamble number, and the amount of synchronization timing deviation. In addition, the higher layer processing unit 101 is regularly notified of the random access transmission state of the terminal apparatus 1 based on the number of received preambles. To keep the synchronization, the synchronization timing measurement unit 105 measures the uplink reference signal input from the reception processing unit 109, measures the synchronization timing deviation, and reports the measurement results to the higher layer processing unit 101.

In accordance with the control signal input from the control unit 107, the transmission processing unit 111 generates the downlink reference signal; encodes and modulates the data information and the downlink control information input from the higher layer processing unit 101, and maps the resultant information in the PDCCH and the PDSCH; multiplexes the information with the generated downlink reference signal; and transmits the multiplexed signal to the terminal apparatus 1 via the transmit antenna.

Specifically, in accordance with the control signal input from the control unit 107, the transmission processing unit 111 performs encoding, such as turbo coding, convolutional coding, and block coding, on the downlink control information of each downlink component carrier input from the higher layer processing unit 101 and data information, and modulates the coded bits in compliance with the modulation scheme such as QPSK, 16QAM, and 64QAM. In addition, the transmission processing unit 111 generates, as the downlink reference signal, a sequence that is already known to the terminal apparatus 1 and that is acquired in accordance with a rule predetermined in advance, based on the Cell Identity (Cell ID) for identifying the base station apparatus 3, and the like. The transmission processing unit 111 multiplexes the PDCCH and PDSCH with the generated downlink reference signal.

The transmission processing unit 111 performs Inverse Fast Fourier Transform (IFFT) on the multiplexed modulation symbol, performs the modulation in compliance with an OFDM scheme to generate an OFDM symbol, attaches the Guard Interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency signal, removes unnecessary frequency components, performs power amplification, and outputs a final result to the transmit antenna for transmission.

Note that the base station apparatus 3 that operates in the LAA cell is configured to include a channel measurement unit 108 configured to perform the LBT procedure and thus to determine whether the channel is idle or busy. The channel measurement unit 108 is implemented with, among other methods, a method for determination using power received through the receive antenna 1013 and a method for determination depending on whether a specific signal from the reception processing unit 109 has been detected. A determination result from the channel measurement unit 108 is transmitted to the control unit 107 and used to control the transmission.

Figure 5:
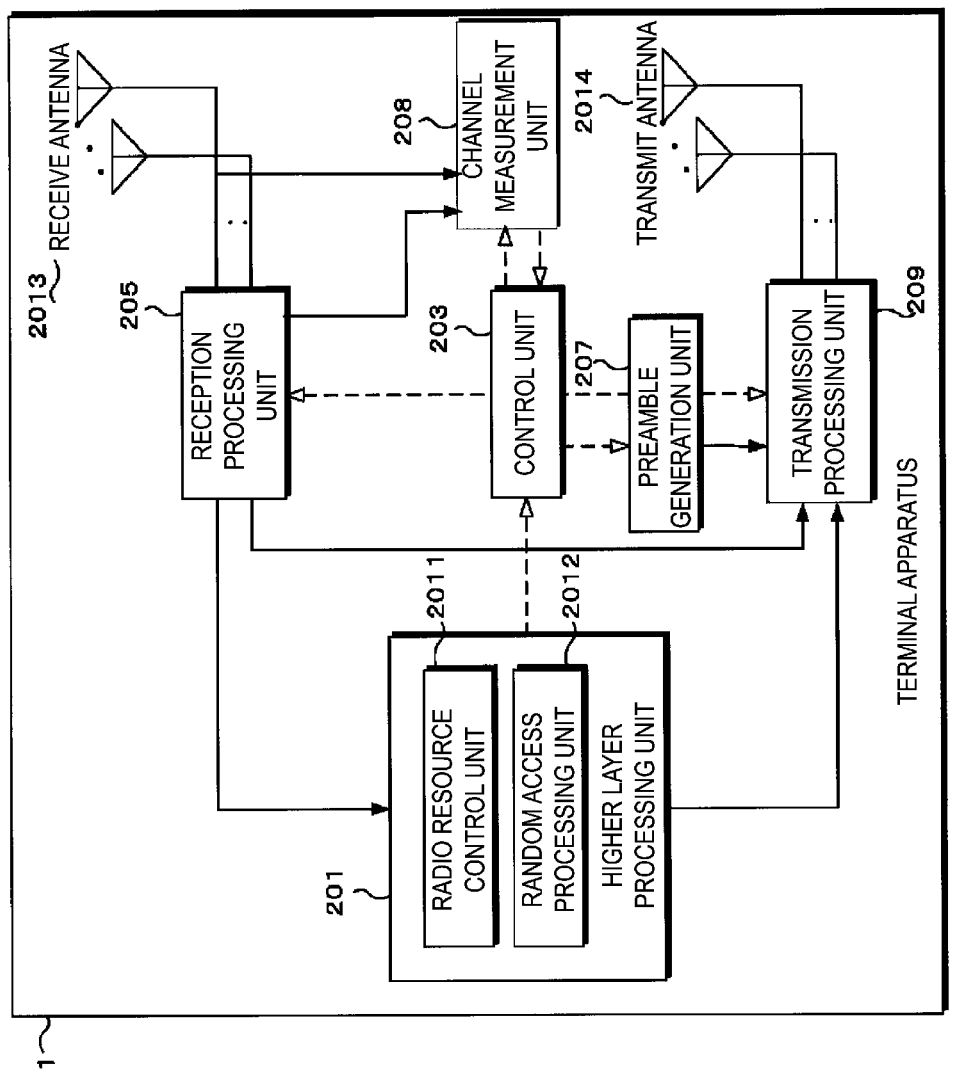
FIG. 5 is a schematic block diagram illustrating a configuration of a terminal apparatus 1 according to the present embodiment.

FIG. 5 is a schematic block diagram illustrating a configuration of the terminal apparatus 1 according to the present embodiment. As illustrated in FIG. 5, the terminal apparatus 1 includes a higher layer processing unit 201, a control unit 203, a reception processing unit 205, a plurality of receive antennas 2013, a preamble generation unit 207, a channel measurement unit 208, a transmission processing unit 209, and a plurality of transmit antennas 2014. In addition, the higher layer processing unit 201 includes a radio resource control unit 2011 and a random access processing unit 2012. Note that in FIG. 5, each of the receive antennas and each of the transmit antennas are illustrated as separate components, but a single antenna shared for the two purposes may be provided by use of a thyristor operable to switch the input and the output of signals.

The higher layer processing unit 201 outputs, to the transmission processing unit 209, the data information, for each uplink component carrier, generated by the user's operation or the like. In addition, the higher layer processing unit 201 performs the processing of the packet data convergence protocol layer, the radio link control layer, and the radio resource control layer. The radio resource control unit 2011 included in the higher layer processing unit 201 manages various pieces of configuration information, the communication state and, the buffer state of the corresponding terminal apparatus 1. The random access processing unit 2012 of the higher layer processing unit 201 performs the control associated with the random access of the corresponding terminal apparatus 1.

In the above-described processing, the radio resource control unit 2011 included in the higher layer processing unit 201 manages various pieces of configuration information, such as the downlink component carrier and the uplink component carrier as well as the C-RNTI allocated to the corresponding terminal apparatus 1. In addition, the radio resource control unit 2011 generates the information mapped in each channel of each uplink component carrier, and outputs the generated information for each of the uplink component carriers to the transmission processing unit 209. For example, in a case where the radio resource of the message 3 is allocated by the random access response, the radio resource control unit 2011 generates information to be transmitted in the message 3, and outputs the generated information to the transmission processing unit 209.

Based on the downlink control information (e.g., the downlink grant, the uplink grant) notified of with the PDCCH from the base station apparatus 3, the uplink grant for the message 3 notified of by the random access, and various pieces of configuration information of the corresponding terminal apparatus 1 managed by the radio resource control unit 2011, the radio resource control unit 2011 generates the control information to control the reception processing unit 205 and the transmission processing unit 209, and outputs the generated control information to the control unit 203.

In the above-described processing, the random access processing unit 2012 included in the higher layer processing unit 201 manages: a pair of uplink component carrier and downlink component carrier for transmission and/or reception of some or entire part of the message associated with the random access and broadcast by the base station apparatus 3; information associated with the random access such as the configuration of the PRACH corresponding to the downlink component carrier and the information indicating the transmission state of the random access; and the information notified of by the base station apparatus 3 and indicating the PRACH corresponding to the particular downlink component carrier capable of starting the random access processing. The random access processing unit 2012 starts the random access in a case where the terminal apparatus 1 receives, from the base station apparatus 3, the PDCCH instructing the start of the random access processing. In addition, the random access processing unit 2012 starts the random access in a case where there is data information to be transmitted via the uplink, but no radio resource of the uplink is allocated by the base station apparatus 3.

In a case where the random access processing unit 2012 is instructed, by the PDCCH from the base station apparatus 3, to start the random access, and in addition, where the preamble number and the radio resource of PRACH corresponding to the downlink component carrier are assigned, the random access processing unit 2012 selects, from the radio resources of the PRACH corresponding to a particular downlink component carrier configured for the base station apparatus 3, the PRACH and the preamble specified by the PDCCH instructing the start of the random access processing.

In addition, in a case where the preamble number and the radio resource of the PRACH are not assigned by the PDCCH instructing the start of the random access processing or in a case where the random access processing unit 2012 has decided to start the random access processing, the random access processing unit 2012 selects randomly the radio resource from the radio resources of the PRACH corresponding to the particular downlink component carrier capable of starting the random access processing, determines the range of the preamble for Contention based Random Access to be selected based on the information on the downlink channel quality, and selects randomly the preamble from the determined range of preambles. Hence, the terminal apparatus 1 can perform the Contention based Random Access with the appropriate random access resource corresponding to the particular downlink component carrier that the base station apparatus 3 has allocated in advance based on the channel quality of the uplink component carrier and the transmission state of the PRACH.

In addition, the random access processing unit 2012 outputs the control information to the control unit 203 so that the preamble generation unit 207 generates the preambles including the selected preamble. In addition, the random access processing unit 2012 outputs the control information to the control unit 203 so that the transmission processing unit 209 transmits the preamble with the radio resource of the selected PRACH.

The random access processing unit 2012 calculates the RA-RNTI corresponding to the radio resource with which the preamble is transmitted. In addition, the random access processing unit 2012 outputs the control information to the control unit 203 so that the reception processing unit 205 monitors the downlink grant including the calculated RA-RNTI in the, downlink component carrier paired with the uplink component carrier with which the preamble has been transmitted. The monitoring continues in a random access response reception period, which is a predetermined period since the transmission of the preamble.

In a case where the preamble number is specified by the base station apparatus 3, the random access processing unit 2012 determines that the random access is successful provided that the preamble number specified by the base station apparatus 3 is included in the random access response where the downlink grant including the calculated RA-RNTI indicates the allocation of the radio resources, and thus finishes the processing associated with the random access processing.

In a case where the preamble number is not specified by the base station apparatus 3, the random access processing unit 2012 detects, from random access response where the downlink grant including the calculated RA-RNTI indicates the allocation of the radio resources the preamble number included in the preambles transmitted from the corresponding terminal apparatus 1. In addition, the random access processing unit 2012 acquires the uplink grant indicating the amount of the synchronization timing deviation, the Temporary C-RNTI, and allocation of the radio resources of the message 3 corresponding to the detected preamble number. In addition, the random access processing unit 2012 outputs the control information to the control unit 203 so that the transmission processing unit 209 adjusts the timing for transmitting the uplink signal based on the amount of synchronization timing deviation.

In addition, the random access processing unit 2012 outputs, to the radio resource control unit 2011, the uplink grant included in the random access response and destined to the corresponding terminal apparatus 1. In addition, the random access processing unit 2012 outputs the control information to the radio resource control unit 2011 so that the message 3 including the information such as the C-RNTI allocated to the base station apparatus 3 or the connectivity request is generated.

The random access processing unit 2012 monitors the contention resolution in the downlink component carrier allocated to the base station apparatus 3. The monitoring is performed during the contention resolution reception period, which is a predetermined period since the transmission of the message 3. In a case where the random access processing unit 2012 detects the contention resolution in the downlink component carrier, the random access processing unit 2012 determines that the random access has been successful, and thus finished the processing associated with the random access.

Based on the control information originating from the higher layer processing unit 201, the control unit 203 generates a control signal for controlling the reception processing unit 205, the preamble generation unit 207, and the transmission processing unit 209. The control unit 203 outputs the generated control signal to the reception processing unit 205, the preamble generation unit 207, and the transmission processing unit 209. The control unit 203 thus controls the reception processing unit 205, the preamble generation unit 207, and the transmission processing unit 209.

In accordance with the control signal input from the control unit 203, the reception processing unit 205 demodulates and decodes a reception signal received from the base station apparatus 3 through the receive antenna, and outputs the resultant decoded information to the higher layer processing unit 201. The reception processing unit 205 generates the channel quality information based on, among other things, the reception quality of the detected downlink reference signal, and outputs the generated channel quality information to the higher layer processing unit 201 and the transmission processing unit 209.

Specifically, the reception processing unit 205 converts (down-converts) each uplink component carrier signal received through the corresponding receive antenna into a signal of an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The reception processing unit 205 removes a portion corresponding to the Guard Interval from the digital signal resulting from the conversion. The reception processing unit 205 performs Fast Fourier Transform on the signal from which the Guard Interval has been removed, and extracts a signal in the frequency domain.

The reception processing unit 205 demultiplexes, for each downlink component carrier, the extracted signal into signals mapped in the PDCCH, the PDSCH, and in the downlink reference signal. Note that the demultiplexing is performed based on the radio resource allocation information that has been notified of with the downlink grant. In addition, the reception processing unit 205 obtains the channel estimate from the demultiplexed downlink reference signal and thus performs the compensation of channel for the PDCCH and for the PDSCH. The reception processing unit 205 generates the channel quality information based on, among other things, the reception quality of the demultiplexed downlink reference signal, and outputs the generated channel quality information to the higher layer processing unit 201 and the transmission processing unit 209.

The reception processing unit 205 demodulates the PDCCH in compliance with the QPSK modulation scheme. The reception processing unit 205 monitors the downlink grant and the uplink grant including the C-RNTI allocated by the base station apparatus 3 to the corresponding terminal apparatus 1. The reception processing unit 205 also monitors the downlink grant including the RA-RNTI corresponding to the radio resource of the PRACH with which the corresponding terminal apparatus 1 transmits the preamble. The reception processing unit 205 thus tries to perform decoding. In a case where the reception processing unit 205 succeeds in the decoding of the PDCCH, the reception processing unit 205 outputs the decoded downlink control information to the higher layer processing unit 201. The reception processing unit 205 demodulates the PDSCH in compliance with the modulation scheme, such as QPSK, 16QAM, and 64QAM, notified of with the downlink grant. The reception processing unit 205 performs the decoding corresponding to the coding rate notified of with the downlink grant. The reception processing unit 205 outputs the decoded data information to the higher layer processing unit 201.

The preamble generation unit 207 generates, in accordance with the control signal input from the control unit 203, preambles including the preamble selected by the random access processing unit 2012. The preamble generation unit 207 outputs the generated preambles to the transmission processing unit 209.

The transmission processing unit 209 generates the uplink reference signal in accordance with the control signal input from the control unit 203. The transmission processing unit 209 encodes and modulates the data information input from the higher layer processing unit 201 and the channel quality information input from the reception processing unit 205. The transmission processing unit 209 maps the encoded and modulated information in the PUSCH and the PUCCH, and multiplexes the information with the generated uplink reference signal. The transmission processing unit 209 transmits the resultant information to the base station apparatus 3 via the transmit antenna. In accordance with the control signal input from the control unit 203, the transmission processing unit 209 maps the preamble input from the preamble generation unit 207 in the PRACH, and transmits the PRACH via the transmit antenna to the base station apparatus 3.

Specifically, in accordance with the control signal input from the control unit 203, the transmission processing unit 209 performs encoding, such as turbo coding, convolutional coding, and block coding, on the uplink control information of each uplink component carrier input from the higher layer processing unit 201 and reception processing unit 205, and modulates the coded bits in compliance with the modulation scheme such as BPSK, QPSK, 16QAM, and 64QAM.

The transmission processing unit 209 generates, as the uplink reference signal, a sequence that is already known to the base station apparatus 3 and that is acquired in accordance with a rule prescribed in advance based on, among other things, the cell identity for identifying the base station apparatus 3. The transmission processing unit 209 spreads the modulation symbols of the PUCCH with codes. In addition, the transmission processing unit 209 rearranges the modulation symbols of the PUSCH in parallel and then performs the Discrete Fourier Transform (DFT) to generate the uplink reference signal. The spread modulation symbols are multiplexed with the generated uplink reference signal. In addition, the transmission processing unit 209 maps the preambles input from the preamble generation unit 207 in the PRACH.

The transmission processing unit 209 performs Inverse Fast Fourier Transform on a signal resulting from the multiplexing, performs modulation in compliance with an SC-FDMA scheme, attaches the Guard Interval to the SC-FDMA-modulated SC-FDMA symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit antenna transmission.

Note that the terminal apparatus 1 that operates in the LAA cell is configured to include a channel measurement unit 208 configured to perform the LBT procedure and thus to determine whether the channel is idle or busy. The channel measurement unit 208 is implemented with, among other methods, a method for determination using power received through the receive antenna 2013 and a method for determination depending on whether a specific signal from the reception processing unit 205 has been detected. A determination result from the channel measurement unit 208 is transmitted to the control unit 203 and used to control the transmission.

Each of the units having the reference signs 201 to 2014 included in the terminal apparatus 1 may be configured as a circuit. Each of the units having the reference signs 101 to 1014 included in the base station apparatus 3 may be configured as a circuit.

The PUSCH transmission timing in the LAA cell will be described in detail below.

Each of the DCI format 0A and the DCI format 0B includes the 'PUSCH trigger A' field and the 'Timing offset' field. The DCI format 0B includes the 'number of scheduled subframes' field. The information bit where the 'PUSCH trigger A' field is mapped is referred also to as the '"PUSCH trigger A'." The value of the information bit where the 'PUSCH trigger A' field is mapped is referred also to as the "value of the 'PUSCH trigger A'." The same rule also applies to the other fields.

The DCI format 1C may include an 'Uplink transmission duration and offset indication' field and/or a 'PUSCH trigger B' field.

In a case where a PDCCH including the DCI format 0A including a 'PUSCH trigger A' field that is set to zero is detected in a subframe n, the terminal apparatus 1 may perform PUSCH transmission in subframes n+k+l+i (i=0, 1, . . . , N−1). In a case where a PDCCH including the DCI format 0B including a 'PUSCH trigger A' field that is set to zero is detected in a subframe n, the terminal apparatus 1 may perform PUSCH transmission in subframes n+k+l+i (i=0, 1, . . . , N−1).

In a case where a PDCCH including the DCI format 0A including a 'PUSCH trigger A' field set to one is detected in a period from a subframe n−v to a subframe n−1, and in addition, where a PDCCH including the DCI format 1C is detected in a subframe n, the terminal apparatus 1 may perform PUSCH transmission in subframes n+k+l+i (i=0, 1, . . . , N−1). In a case where a PDCCH including the DCI format 0B including a 'PUSCH trigger A' field set to one is detected in a period from a subframe n−v to a subframe n−1, and in addition, where a PDCCH including the DCI format 1C is detected in a subframe n, the terminal apparatus 1 may perform PUSCH transmission in subframes n+k+l+i (i=0, 1, . . . , N−1). The above-mentioned period from a subframe n−v to a subframe n−1 includes both the subframe n−v to the subframe n−1. The 'Uplink transmission duration and offset indication' field and/or the 'PUSCH trigger B' field included in the DCI format 1C is set to a particular value. For example, the 'PUSCH trigger B' field may be set to one. For example, the 'Uplink transmission duration and offset indication' field may be set to a value that is not a prescribed value. The above-mentioned prescribed value may be 00000 and 11111. The fact that the 'Uplink transmission duration and offset indication' field and/or the 'PUSCH trigger B' field is set to a particular value is referred also to as the fact that the 'Uplink transmission duration and offset indication' field and/or the 'PUSCH trigger B' field is set to trigger the PUSCH transmission.

The symbol i represents an integer from 0 to N−1. The value N is an integer that is greater than zero. For the DCI format 0A, the value N is one. For the DCI format 0B, the value N is determined in accordance with the 'number of scheduled subframes' in the field DCI format 0B.

In a case where the 'PUSCH trigger A' field is set to zero, the value k may be determined in accordance with the value of the 'Timing offset' field. In a case where the 'PUSCH trigger A' field is set to one, the value k may be determined in accordance with the values of the first and the second information bits of the 'Timing offset' field.

The symbol v represents the length of the validation duration. The validation duration may be referred also to as the "time window." In a case where the 'PUSCH trigger A' field is set to one, the values of the third and the fourth information bits of the 'Timing offset' field are used for representing the symbol v. In a case where the 'PUSCH trigger A' field is set to one, a 'validation duration' field may be mapped in the third and the fourth information bits of the 'Timing offset' field.

In a case where a PDCCH including the DCI format 0A/0B including a 'PUSCH trigger A' field set to one is detected in a subframe n−v, and in addition, where no PDCCH including the DCI format 1C is detected by a subframe n, the terminal apparatus 1 may cancel the PUSCH transmission corresponding to the DCI format 0A/0B. The 'Uplink transmission duration and offset indication' field and/or the 'PUSCH trigger B' field included in the DCI format 1C is set to a particular value. In a period from the time when a PDCCH including the DCI format 0A/0B including a 'PUSCH trigger A' field set to one is detected in a subframe n−v to the time when a DCI format 1C with an 'Uplink transmission duration and offset indication' field, and/or a 'PUSCH trigger B' field set to a particular value is detected, the triggered PUSCH transmission is pending. In a period from the time when a PDCCH including the DCI format 0A/0B including a PUSCH trigger A' field set to one is detected in a subframe n−v to the time when the PUSCH transmission is canceled, the triggered PUSCH transmission is pending. To put it differently, the PUSCH scheduled by the DCI format 0A/0B including a 'PUSCH trigger A' field set to one is valid for a validation duration indicated by the third and the fourth information bits of the 'Timing offset' field in the DCI format 0A/0B. To put it differently, the PUSCH scheduled by the DCI format 0A/0B including a 'PUSCH trigger A' field set to one is valid for a validation duration indicated by the third and the fourth information bits of the 'Timing offset' field in the DCI format 0A/0B. To put it differently, the scheduling of the PUSCH triggered by the DCI format 1C including a 'Uplink transmission duration and offset indication' field and/or a 'PUSCH trigger B' field set to a particular value is valid for the validation duration.

In a case where the 'PUSCH trigger A' field is set to zero, the value 1 may be a prescribed value (e.g., four). In a case where the 'PUSCH trigger A' field is set to one, the value 1 is an uplink offset (UL offset). The above-mentioned uplink offset may be determined by the 'Uplink transmission duration and offset indication' field included in the DCI format 1C.

FIGS. 6A and 6B are diagrams illustrating an example of a PUSCH scheduling in the present embodiment. In FIGS. 6A and 6B, the horizontal axis represents the time domain (i.e., subframe number). Each of FIGS. 6A and 6B illustrate up to one DCI format 0A/0B, up to one DCI format 1C, and up to one PUSCH. In a case where there are more than one DCI formats 0A/0B, more than one DCI formats 1C, and/or more than one PUSCHs, an operation that is different from the one in the present embodiment may be applied.

The DCI format 0A/0B (600) is either the DCI format 0A or the DCI format 0B. In the case of FIGS. 6A and 6B, the integer N is one. Hence, the value i is zero.

In FIG. 6A the 'PUSCH trigger A' field included in the DCI format 0A/0B (600) is set to zero. The DCI format 0A/0B (600) is transmitted in the subframe n. The PUSCH (601) is scheduled by the uplink grant (600). The transmission of the PUSCH (601) is performed in the subframe n+k+l+i. In FIG. 6A, the symbol l represents a predetermined value (e.g., four), the value k is determined by 'Timing offset' field included in the DCI format 0A/0B (600).

The DCI format 0A/0B (602) is either the DCI format 0A or the DCI format 0B. In FIG. 6B the 'PUSCH trigger A' field included in the DCI format 0A/0B (602) is set to one. The DCI format 0A/0B (602) is transmitted in the subframe n−X. The subframe n−X is located between the subframe n−v and the subframe n. The DCI format 1C (603) is transmitted in the subframe n. The DCI format 1C (603) is transmitted in the validation duration. The validation duration may start in a subframe that is later than the subframe n−x. For example, the validation duration may start in the subframe n−X+1 and will end in the subframe n−X+v. The length of the validation duration may be indicated by the third and the fourth information bits of the 'Timing offset' field in the DCI format 0A/0B (602).

The transmission of the PUSCH (604) is performed in the subframe n+k+l+i. In FIG. 6B, the value l is determined at least based on the 'Uplink transmission duration and offset indication' field in the DCI format 1C, the value k is determined at least based on the first and the second information bits of the 'Timing offset' field included in the DCI format 0A/0B (600).

The 'Uplink transmission duration and offset indication' field in the DCI format 1C may represents the length d of the uplink duration. For example, in FIG. 6B, the uplink duration may start in the subframe n+l, and in addition, may end in the subframe n+l+d−1. The terminal apparatus 1 may not monitor the PDCCH in the uplink duration. The terminal apparatus 1 may perform an uplink transmission in the uplink duration.

In addition, the DCI format 1C added with the CRC parity bits scrambled with the CC-RNTI may include a 'Subframe configuration for LAA' field. The 'Subframe configuration for LAA' field indicates the number of OFDM symbols to be used for the transmission of the downlink physical channel and/or physical signal in the current subframe or the next subframe. In a case where the 'Subframe configuration for LAA' field indicates the OFDM symbol in the next subframe, the terminal apparatus 1 may determine that the next subframe is the downlink subframe.

Each of the DCI format 0A and the DCI format 0B includes an 'LBT Type' field and a 'Priority class' field. The 'LBT Type' field indicates the type of the uplink LBT procedure to be used for the channel sensing that is to be performed before the terminal apparatus 1 performs the PUSCH transmission. The 'Priority class' field indicates the value of the channel access priority class of the type-1 uplink LBT procedure to be used in the channel sensing.

The terminal apparatus 1 may determine the type of and the channel access priority class of the uplink LBT procedure in accordance with the 'LBT Type' field and the 'Priority class' field included in the uplink grant (DCI format 0A and DCI format 0B). The terminal apparatus 1 may perform the channel sensing based on the determined type of the uplink LBT procedure and on the determined channel priority class. For example, in a case where the 'LBT Type' field indicates (notifies of) the type 1, the terminal apparatus 1 may perform the type-1 uplink LBT procedure based on the channel access priority class indicated by the 'Priority class' field and may then perform the PUSCH transmission. In an alternative case where, for example, the 'LBT Type' field indicates (notifies of) the type 2, the terminal apparatus 1 performs the type-2 uplink LBT procedure irrespective of the 'Priority class' field, and then performs the PUSCH transmission.

In an alternative case where, for example, the subframe to be used in the PUSCH transmission is in the uplink duration d, the terminal apparatus 1 may perform the type-2 uplink LBT procedure irrespective of the uplink LBT type that has been notified of by the uplink grant. To put it differently, in a case where the subframe to be used for the PUSCH transmission is in the uplink duration d, the terminal apparatus 1 may perform the type-2 uplink LBT procedure even when the uplink grant notifies the terminal apparatus 1 of the type 2 uplink LBT.

The random access procedure in the present embodiment will be described below.

In the present embodiment, a random access procedure may be performed in the primary cell, the secondary cell, or the LAA cell. Note that not more than one random access procedure is performed at any point in the time domain. To put it differently, no two or more random access procedures are performed simultaneously.

The random access procedure includes a contention based random access procedure and a non-contention based random access procedure.

In addition, the non-contention based random access procedure may be started by a PDCCH order. The base station apparatus 3 transmits the PDCCH order to the terminal apparatus 1 on the PDCCH. The terminal apparatus 1 transmits a random access preamble on the PRACH. The PDCCH order is referred also to as the "random access message 0."

The DCI format 1A is used for the random access procedure that is to be started by the PDCCH order. The following kinds of information may be transmitted by use of the DCI format 1A. To put it differently, the PDCCH order may indicate at least some or all of the following kinds of information.

Preamble Index
PRACH Mask Index
Information on the random access procedure
LBT Type
Priority class In the present embodiment, a contention based random access procedure and a non-contention based random access procedure may be performed in the LAA cell. Note that in a case where an LAA cell is used as a primary cell or a Primary Secondary Cell, the contention based random access procedure and/or the non-contention based random access procedure may be performed in the LAA cell. In an alternative case where a LAA cell is used as a secondary cell, the non-contention based random access procedure is performed in the LAA cell.

The random access preamble, which is a message 1 of the random access procedure, is transmitted with the PRACH in the primary cell, the secondary cell, or the LAA cell. The resource for the random access preamble transmission with the PRACH may be referred to as the "PRACH resource." The terminal apparatus 1 receives, from the base station apparatus 3, information (RRC message and system information) on the random access procedure. The information on the random access procedure includes information indicating a set of PRACH resources. In a case where the random access procedure is started by a PDCCH order, the PRACH resource may be notified of by information included in the PDCCH order and indicating a set of the field and/or the PRACH resource. Note that the DCI format 1A added with CRC parity bits scrambled with the C-RNTI is used as the PDCCH order. Hereinafter, the random access preamble may be referred also to as the "preamble."

The preamble is configured such that multiple sequences are used for notifying the base station apparatus 3 of the information. For example, 64 kinds of sequences (preamble index numbers 1 to 64) are provided for the above-mentioned purpose. In a case where the message 3 has a small transmission size, each of the terminal apparatuses 1 that perform the contention based random access procedure preamble selects randomly an index number from index numbers 1 to 24. In a case where the message 3 has a large transmission size, each of the terminal apparatuses 1 that perform the contention based random access procedure randomly selects an index number from index numbers 25 to 48. The indexes of the small-message-size case are typically selected in a case where the channel has unfavorable performances (or the distance between the terminal apparatus 1 and the base station apparatus 3 is large), whereas the indexes of the large-message-size case are selected in a case where the channel has favorable performances (or the distance between the terminal apparatus 1 and the base station apparatus 3 is small). The preamble index number may be referred also to as the preamble number.

In addition, the terminal apparatus 1 to perform the non-contention based random access procedure is notified of, by PDCCH or the like, any one of the index numbers selected by the base station apparatus 3 from the index numbers 49 to 64. Note that in a case where the information indicating the preamble index of the PDCCH instructing the start of the random access processing is a particular code point (e.g., all "0"), the terminal apparatus 1 performs the contention based random access procedure. For example, in a case where the base station apparatus 3 transmits, to the terminal apparatus 1, the PDCCH instructing the start of the random access processing but where there is no preamble index for non-contention based random access that can be allocated to the terminal apparatus 1, the base station apparatus 3 uses the PDCCH instructing the start of the random access processing to instruct the terminal apparatus 1 to start the contention based random access.

In a case of the contention based random access procedure, the terminal apparatus 1 itself selects randomly the preamble index. In a case of the non-contention based random access procedure, the terminal apparatus 1 selects the random access preamble index based on the information received from the base station apparatus 3.

The random access response for the primary cell, secondary cell, or the LAA cell is the message 2 of the random access procedure, and is transmitted with the PDSCH in the primary cell. The random access response for a particular cell corresponds to the random access preamble transmitted in the particular cell. The PDCCH corresponding to the PDSCH including the random access response (DL-SCH, transport block) includes a Random Access-Radio Network Identifier (RA-RNTI). The PDCCH includes downlink control information (downlink grant).

The random access response includes: uplink grant field mapped in the uplink grant, a Temporary C-RNTI field mapped in the information indicating the Temporary Cell Radio Network Temporary Identifier (C-RNTI); and a Timing Advance (TA) command. The uplink grant included in the random access response is referred also to as the "random access response grant." The terminal apparatus 1 adjusts the PUSCH transmission timing based on the TA command. The PUSCH transmission timing may be adjusted for each group of cells.

In a case where the received random access response includes a random access preamble identifier corresponding to the transmitted random access preamble and where the terminal apparatus 1 selects a random access preamble based on the information received from the base station apparatus 3, the terminal apparatus 1 considers that the non-contention based random access procedure has been successfully completed, and transmits a transport block on the PUSCH based on the random access response grant.

In a case where the received random access response includes a random access preamble identifier (index) corresponding to the transmitted random access preamble and where the terminal apparatus 1 itself selects a random access preamble randomly, the terminal apparatus 1 set the Temporary C-RNTI to a value of the Temporary C-RNTI field, and transmits the random access message 3 (transport block) with the PUSCH based on the uplink grant included in the random access response.

The PUSCH corresponding to the uplink grant included in the random access response may be transmitted in the Serving cell where the corresponding preamble is transmitted with the PRACH.

Once the base station apparatus 3 receives a message 3 from a particular terminal apparatus 1, the base station apparatus 3 transmits, to the particular terminal apparatus 1, a contention resolution (message 4) indicating that the particular terminal apparatus 1 has succeeded the random access, that is, indicating that there is no preamble collision occurs between the particular terminal apparatus 1 and another terminal apparatus 1 or indicating that even though there is a preamble collision between the particular terminal apparatus 1 and another terminal apparatus 1, the particular terminal apparatus 1 overcomes the collision.

After transmitting the message 3, the terminal apparatus 1 receives a contention resolution. Based on the reception of the contention resolution, the terminal apparatus 1 considers that the contention based random access procedure is completed successfully.

In the LAA cell, before the terminal apparatus 1 performs the PRACH transmission (preamble transmission), an LBT has to be performed. In the present embodiment, the LBT type to be used for the PRACH transmission may be determined based on whether the PRACH resource is in the uplink duration (UL duration) secured from the base station apparatus 3.

Figure 7:
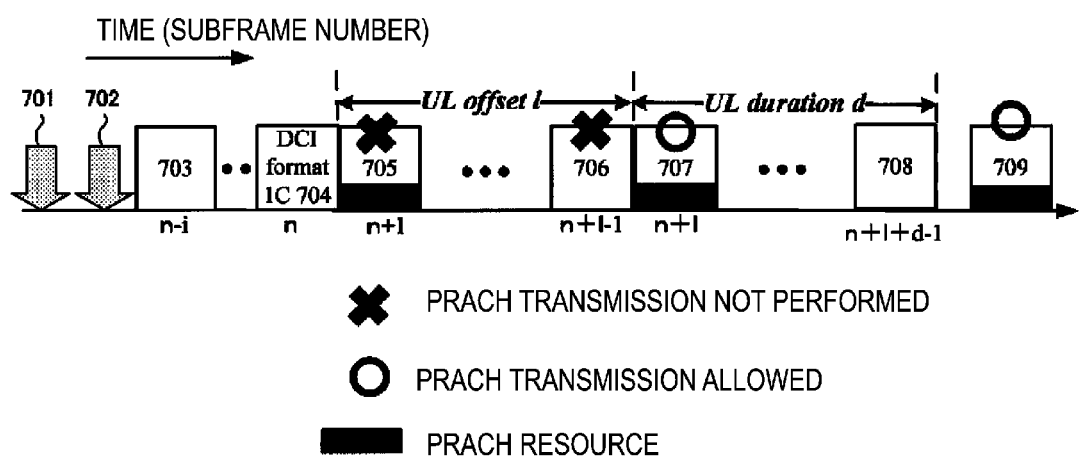
FIG. 7 is a diagram illustrating one example of transmission on a PRACH in the present embodiment.

FIG. 7 is a diagram illustrating one example of transmission on a PRACH in the LAA cell in the present embodiment. In FIG. 7, the horizontal axis represents the time domain (i.e., subframe number).

(701) In a case where the terminal apparatus 1 establishes a connection in a particular LAA cell that belongs to the base station apparatus 3, a cell search may be performed. The signal to be used in the cell search is referred to as a "Synchronization Signal." The Synchronization Signals are used to adjust timings for downlink signals and/or channels mainly between a base station apparatus 3 transmitting downlink signals and/or channels and a terminal apparatus 1 receiving downlink signals and/or channels. The Synchronization Signal includes a PSS and an SSS. The terminal apparatus 1 detects the Synchronization Signal and thus takes the downlink synchronization with the corresponding cell. After taking the downlink synchronization, the terminal apparatus 1 gets the reception timing of the downlink subframe. The terminal apparatus 1 detects the Synchronization Signal, and thus can identify the Physical Cell Identity (PCI) of the cell. Alternatively, the terminal apparatus 1 may be notified of the Physical Cell Identity of the cell by an RRC message. The terminal apparatus 1 may receive, either in the primary cell or the secondary cell, an RRC message instructing the addition of an LAA cell. The RRC message instructing the addition of an LAA cell may indicate the Physical Cell Identity of the LAA cell and the carrier frequency of the LAA cell.

(702) In a case where the terminal apparatus 1 gets the initial access to the LAA cell, the terminal apparatus 1 performs a cell search and then decodes the Physical Broadcast Channel (PBCH) of the cell. The terminal apparatus 1 acquires a Master Information Block (MIB, a Broadcast Channel (BCH)) that is shared by the terminal apparatuses 1. The MIB includes information on the downlink system bandwidth of the cell, the System Frame Number (SFN), the number of transmit antennas, etc. Note that in a case where an LAA cell is configured as a secondary cell or a Primary Secondary Cell, the terminal apparatus 1 does not have to read the MIB in the cell.

(703) The terminal apparatus 1 may be notified of the information on the random access procedure in the LAA cell as System Information Block (SIB). In addition, the terminal apparatus 1 may be notified of the information on the random access procedure by an individual RRC message. The information on the random access procedure may be included in a handover command or a PDCCH order. Based on the information on the random access procedure, the terminal apparatus 1 acquires information indicating a set of PRACH resources to be used for the preamble transmission. In the example illustrated in FIG. 7, based on the information on the random access procedure, the PRACH resources are in the subframe (705), the subframe (707), and the subframe (709), for example. The terminal apparatus 1 may receive the PDCCH order in the subframe (703).

After the terminal apparatus 1 takes the downlink synchronization of the cell, the terminal apparatus 1 can monitor (decode) the DCI format 1C added with CRC parity bits scrambled with the CC-RNTI. In the example illustrated in FIG. 7, a DCI format 1C added with CRC parity bits scrambled with the CC-RNTI is detected in the subframe n (704). In addition, the 'Uplink transmission duration and offset indication' field included in the detected DCI format 1C indicates the value of the length 1 of the uplink offset (UL offset) and the value of the length d of the uplink duration (UL duration).

The terminal apparatus 1 may perform the PRACH transmission in the subframes configured with PRACH resources: the subframe n+1 (705), the subframe (707), and the subframe (709). In a case where the 'Subframe configuration for LAA' field included in the DCI format 1C in the subframe n (704) instructs the next subframe n+1 (705) as a downlink subframe and in addition, where the subframe n+1 (705) includes a PRACH resource, the terminal apparatus 1 does not have to perform the PRACH transmission in the subframe n+1 (705). To put it differently, in a case where a subframe including a PRACH resource configured in advance by the information on the random access procedure is configured as a downlink subframe by the DCI format 1C, the terminal apparatus 1 does not use the PRACH resource, or does not perform PRACH transmission using the PRACH resource. Note that in a case where the 'Subframe configuration for LAA' field included in the DCI format 1C indicates, in the next subframe, the number of OFDM symbols to be used for the transmission of the downlink physical channel and/or physical signal, the terminal apparatus 1 may determine that the subframe is a downlink subframe. Hence, in a case where the subframe to be configured for the PRACH transmission is a downlink subframe, no PRACH transmission is performed in the downlink subframe. Note that the number of OFDM symbols to be used for the transmission of the downlink physical channel and/or physical signal is either one or more than one (i.e., is non-zero).

As described earlier, in a case where a subframe including a PRACH resource configured in advance by the information on the random access procedure is configured as a downlink subframe by the DCI format 1C, the terminal apparatus 1 does not use the PRACH resource, or does not perform PRACH transmission using the PRACH resource. In this case, the transmission counter PREAMBLE_TRANSMISSION_COUNTER holds the current value without any increment by one. To put it differently, the transmit power for PRACH transmission does not have to be ramped up.

Description will be given below about the configuration of the transmit power $P_{PRACH}$ for the PRACH (random access preamble) transmission.

The transmit power $P_{PRACH}$ for the PRACH (random access preamble) transmission is configured based at least on a state variable PREAMBLE_TRANSMISSION_COUNTER. The transmit power $P_{PRACH}$ for the PRACH (random access preamble) transmission is ramped up based on the state variable PREAMBLE_TRANSMISSION_COUNTER. The state variable PREAMBLE_TRANSMISSION_COUNTER is referred also to as a "transmission counter." The transmit power $P_{PRACH}$ is obtained by Equation (1) and Equation (2).

$$P_{PRACH}=\min\{P_{CMAX,c}(i), \text{PREAMBLE\_RECEIVED\_TARGET\_POWER}+PL_c\} \ [dBm] \quad \text{Equation (1)}$$

where $P_{CMAX,c}(i)$ is the configured UE transmit power for subframe i of serving cell c; and $PL_c$ is the downlink path loss estimate calculated in the UE for serving cell c.

PREAMBLE_RECEIVED_TARGET_POWER==preambleInitialReceivedTargetPower+DELTA_PREAMBLE+(PREAMBLE_TRANSMISSION_COUNTER−1)*powerRampingStep   Equation (2)

where preambleInitialReceivedTargetPower and powerRampingStep are provided by the higher layer (RRC layer); and DELTA_PREAMBLE is the random access preamble format based power offset value.

The min { } is a function that outputs the minimum value from a plurality of input values. $P_{CMAX,c}$ (i) is the maximum value of transmit power for the subframe i of the Serving cell c. The maximum value of transmit power is referred also to as a configured UE transmit power. $PL_c$ is a downlink path loss prediction for the Serving cell c. The downlink path loss prediction is calculated by the terminal apparatus 1.

DELTA_PREAMBLE is a power offset value based on the random access preamble format. The preambleInitialReceivedTargetPower and the powerRampingStep is parameters of the higher layer (RRC layer). The base station apparatus 3 may transmit information indicating a parameter of the higher layer (RRC layer) to the terminal apparatus 1. The preambleInitialReceivedTargetPower represents the initial transmit power for the PRACH (random access preamble) transmission. The powerRampingStep indicates the transmit power step which is to be ramped up based on the transmission counter PREAMBLE_TRANSMISSION_COUNTER. To put it differently, the transmission counter is associated with the number of times when the transmit power is ramped up. In addition, by setting the transmission counter to one, the ramping up of the transmit power is reset. In addition, by incrementing the transmission counter by one, the ramping up of the transmit power is applied once.

In a case where the PRACH resource is in the period of the uplink offset (UL offset) 1, the terminal apparatus 1 does not have to perform the PRACH transmission. For example, in a case where the subframe (706) is a PRACH resource, and in addition where the subframe (706) is within the period of uplink offset (UL offset) 1, the terminal apparatus 1 does not use the PRACH resource in the subframe (706), and thus does not perform the PRACH transmission. In this case, the transmission counter is not incremented by one, but is held as it is. To put it differently, the transmit power for PRACH transmission does not have to be ramped up.

Subsequently, in a case where the subframe n+1 (707) is a PRACH resource, and in addition, where the subframe n+1 (707) is within the period of the uplink duration (UL duration) d, the terminal apparatus 1 performs the PRACH transmission using the PRACH resource. To put it differently, in a case where at least part of the PRACH resource is in the uplink duration, the terminal apparatus 1 may perform a type-2 (LBT category2) uplink LBT procedure before performing the PRACH transmission in the PRACH resource. Even in a case where the configuration information of the LBT instructs the terminal apparatus 1 to perform the type-1 uplink LBT procedure, the terminal apparatus 1 may perform the type-2 (LBT category2) uplink LBT procedure before performing the PRACH transmission in the PRACH resource (707). In a case where the terminal apparatus 1 performs the PRACH transmission using the PRACH resource in the subframe (707), the terminal apparatus 1 increments the transmission counter by one. To put it differently, the transmit power for the PRACH transmission may be ramped up.

In addition, in a case where the subframe (709) is a PRACH resource, and in addition, where the subframe (709) is outside of the period of the uplink duration (UL duration) d, the terminal apparatus 1 may perform the PRACH transmission using the PRACH resource. In this case, based on the LBT configuration information that has been notified of, the terminal apparatus 1 may perform the uplink LBT procedure for the PRACH transmission. In a case where the terminal apparatus 1 performs the PRACH transmission using the PRACH resource in the subframe (707), the terminal apparatus 1 increments the transmission counter by one. To put it differently, the transmit power for the PRACH transmission may be ramped up.

The LBT configuration information may be notified of by an RRC message from the base station apparatus 3. In addition, if the random access procedure is started (triggered) by the PDCCH order, the LBT configuration information may be notified of by the field included in the PDCCH order. For example, in the DCI format 1A used for the PDCCH order, an 'LBT Type' field and a 'Priority class' field may be configured anew. To put it differently, an 'LBT Type' field and a 'Priority class' field may be mapped in the LBT configuration information. A 1-bit 'LBT Type' field indicates either the type-1 uplink LBT procedure and the type-2 uplink LBT procedure. A 2-bit 'Priority class' field indicates four different kinds of channel access priority classes. In addition, the 'Priority class' field may be configured as 1 bit. In this case, the 1-bit 'Priority class' field indicates two different kinds of channel access priority classes. For example, the two different kinds of channel access priority classes may be the channel access priority class 1 and the channel access priority class 2.

The LBT configuration information may be included in the handover command that instructs a handover. The LBT configuration information may be configured in advance by specifications or the like. For example, outside of the period of the uplink duration (UL duration) d, the LBT type to be used for the PRACH transmission may be the type 1 (LBT category4) with the value of the channel access priority class is configured to one. In addition, the LBT type to be used for the PRACH transmission may be the type 2, for example. The LBT configuration information may include the value of the LBT type and/or the value of the channel access priority class.

Hence, in a case where the type 1 LBT is configured for the terminal apparatus 1, the terminal apparatus 1 performs the type 1 uplink LBT procedure in the PRACH resource (709) outside of the period of the uplink duration d before performing the PRACH transmission. In a case where the type-2 LBT is configured for the terminal apparatus 1, the terminal apparatus 1 performs the type-2 uplink LBT procedure in the PRACH resource (709) before performing the PRACH transmission.

The LBT configuration information may include first LBT configuration information for the PRACH transmission within the period of the uplink duration d, and second LBT configuration information for the PRACH transmission outside of the period of the uplink duration d. The terminal apparatus 1 may perform the uplink LBT procedure for the PRACH transmission within the period of the uplink duration d based on the first LBT configuration information. The terminal apparatus 1 may perform the uplink LBT procedure for the PRACH transmission outside of the period of the uplink duration d based on the second LBT configuration information.

In the example illustrated in FIG. 7, in a case where the terminal apparatus 1 that has performed a first PRACH (preamble) transmission in the subframe (707) determines that the random access procedure has been unsuccessful, the terminal apparatus 1 may perform a second PRACH (preamble) transmission in the subframe (709). The terminal apparatus 1 may decide separately the type of the uplink LBT procedure for the first PRACH transmission in the subframe (707) and the type of the uplink LBT procedure for the second PRACH transmission in the subframe (709). To put it differently, the terminal apparatus 1 may determine which of the two different types of the uplink LBT procedure to be used for each PRACH transmission based on whether or not each PRACH transmission is within the period of the uplink duration d.

Figure 8:
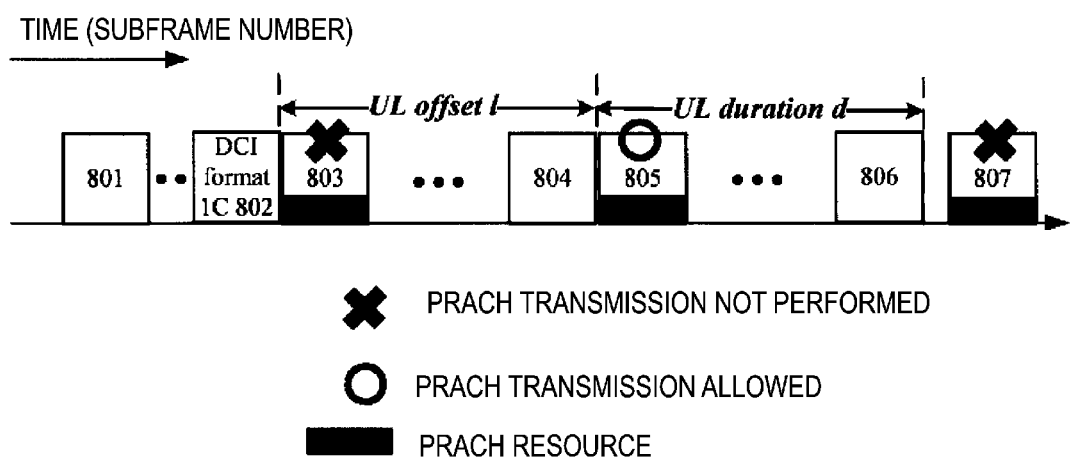
FIG. 8 is a diagram illustrating one example of transmission on a PRACH in the present embodiment.

FIG. 8 is a diagram illustrating one example of transmission on a PRACH in the present embodiment.

Based on the information on the random access procedure, the terminal apparatus 1 acquires information indicating a set of PRACH resources to be used for the preamble transmission. For example, based on the information on the random access procedure, the PRACH resources are the subframe (803), the subframe (805), and the subframe (807).

The terminal apparatus 1 detects (monitor, decode) the DCI format 1C to which the CRC parity bits scrambled with the CC-RNTI are attached, and then performs the random access procedure. The 'Uplink transmission duration and offset indication' field included in the detected DCI format 1C indicates the value of the length 1 of the uplink offset (UL offset) and the value of the length d of the uplink duration (UL duration).

Based on whether or not the PRACH resource is within the period of the uplink duration d, the terminal apparatus 1 determines whether or not to perform the PRACH transmission. In a case where the PRACH resource is within the period of the uplink duration d, the terminal apparatus 1 performs the PRACH transmission using the PRACH resource. In a case where the PRACH resource is outside of the period of the uplink duration d, the terminal apparatus 1 does not have to use the PRACH resource and does not have to perform the PRACH transmission using the PRACH resource. To put it differently, the terminal apparatus 1 may determine, for each PRACH transmission, whether or not the PRACH resource is within the period of the uplink duration d. In the example illustrated in FIG. 8, performing the PRACH transmission outside of the period of the uplink duration d may be prohibited. Hence, performing the PRACH transmission is limited to within the period of the uplink duration d.

In the example illustrated in FIG. 8, in a case where the subframe (803) and the subframe (807) both of which are PRACH resources are outside of the period of the uplink duration d, the terminal apparatus 1 does not have to perform the PRACH transmission in the subframe (803) or in the subframe (807). Note that the base station apparatus 3 may allocate the downlink data in the subframes which are outside of the period of the uplink duration d and in which the PRACH resources exist. In a case where the terminal apparatus 1 does not use the PRACH resources in any of the subframe (803) and the subframe (807), and in addition, where the terminal apparatus 1 does not perform the PRACH transmission, the terminal apparatus 1 holds the transmission counter as it is. To put it differently, the transmit power for PRACH transmission does not have to be ramped up.

In a case where the subframe (805) that is a PRACH resource is within the period of the uplink duration d, the terminal apparatus 1 performs the PRACH transmission in the subframe (805). In this case, the terminal apparatus 1 performs the type-2 uplink LBT procedure before performing the PRACH transmission. In a case where the terminal apparatus 1 performs the PRACH transmission using the PRACH resource in the subframe (805), the terminal apparatus 1 increments the transmission counter by one. To put it differently, the transmit power for the PRACH transmission may be ramped up.

Figure 9:
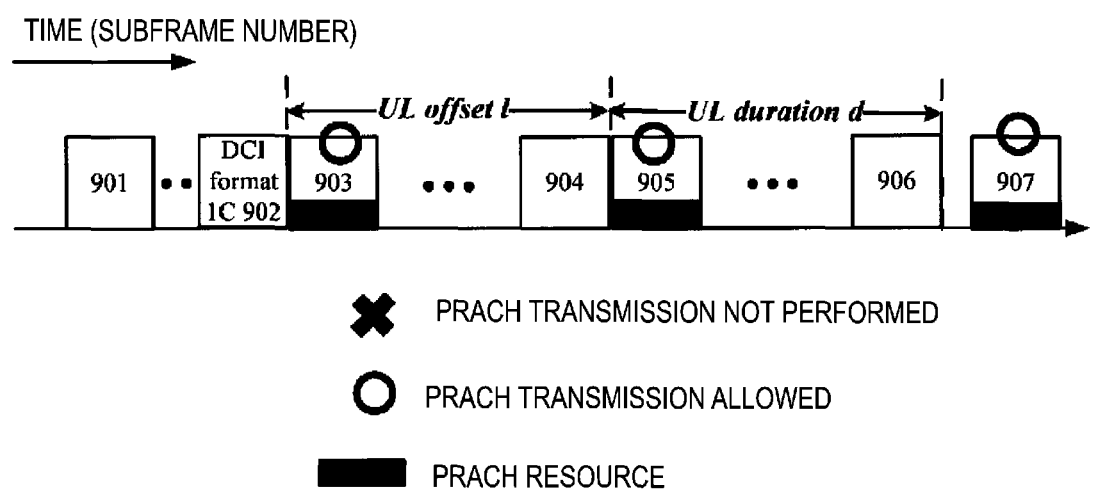
FIG. 9 is a diagram illustrating another example of transmission on a PRACH in the present embodiment.

FIG. 9 is a diagram illustrating another example of transmission on a PRACH in the present embodiment.

Based on the information on the random access procedure, the terminal apparatus 1 acquires information indicating a set of PRACH resources to be used for the preamble transmission. For example, based on the information on the random access procedure, the PRACH resources are the subframe (903), the subframe (905), and the subframe (907).

In the example illustrated in FIG. 9, irrespective of whether or not the PRACH resource is within the period of the uplink duration d, the terminal apparatus 1 performs the PRACH transmission in every subframe configured to be the PRACH resource. Note that the base station apparatus 3 does not have to schedule the downlink data in any of the subframes configured to be PRACH resources. To put it differently, the terminal apparatus 1 may perform the PRACH transmission in any of the subframes (903), (905), and (907) that are configured to be PRACH resources. In a case where the terminal apparatus 1 performs the PRACH transmission by use of the PRACH resource configured in advance, the terminal apparatus 1 increments the transmission counter by one. To put it differently, the transmit power for the PRACH transmission may be ramped up. In this case, the terminal apparatus 1 does not have to detect (monitor, decode) the DCI format 1C to which the CRC parity bits scrambled with the CC-RNTI are attached. The LBT configuration information to be used for the PRACH transmission may be notified of by an RRC message from the base station apparatus 3. Alternatively, the LBT configuration information may be notified of by the PDCCH order. The LBT configuration information may be included in the handover command that instructs a handover. The LBT configuration information may be configured in advance by specifications or the like. The terminal apparatus 1 may determine the type of the LBT and perform the uplink LBT procedure based on the LBT configuration information having been notified of.

Note that the terminal apparatus 1 may firstly detect (monitor, decode) the DCI format 1C to which the CRC parity bits scrambled with the CC-RNTI are attached, and then performs the random access procedure. The 'Uplink transmission duration and offset indication' field included in the detected DCI format 1C indicates the value of the length 1 of the uplink offset (UL offset) and the value of the length d of the uplink duration (UL duration). In a case where the PRACH resource is within the period of the uplink duration d, the terminal apparatus 1 may perform the type-2 uplink LBT procedure.

To put it differently, the prescribed period of the LBT to be performed by the terminal apparatus 1 in the PRACH transmission may be determined based at least on whether or not at least a part of the PRACH resources is within the prescribed period. The prescribed period of the LBT may be 25 µs in the case of the type 2. In addition, the prescribed period of the LBT in the case of the type 1 may be determined based on the contention window. In addition, whether or not the PRACH transmission is to be performed may be determined based at least on whether or not at least a part of the PRACH resources is within a prescribed period. The above-mentioned prescribed period may be the uplink duration. Alternatively, the prescribed period may be the uplink offset.

In addition, the prescribed period of the LBT to be performed by the terminal apparatus 1 in the predetermined transmission may be determined based at least on whether or not at least a part of the resources configured for the prescribed transmission is within the period of the prescribed period. In addition, whether or not the prescribed transmission is to be performed may be determined based at least on whether or not at least a part of the resources configured for the prescribed transmission is within the period of the prescribed period. The above-mentioned prescribed transmission may be the transmission operation to be performed by the terminal apparatus 1 irrespective of the uplink grant from the base station apparatus 3. To put it differently, the prescribed transmission may be transmission without any grant (or grant-free transmission, grant-free access). In addition, the resource configured for the prescribed transmission may be the resource (or the resource pool) to be configured (or scheduled) for the transmission without any grant. Alternatively, the resource configured for the prescribed transmission may be configured based on the higher-layer signal and/or the Semi-Persistent-Scheduling RNTI (SPS-RNTI).

As described earlier, the terminal apparatus 1 may be made, by the PDCCH order, to trigger the operation illustrated in FIG. 7 to FIG. 9 illustrating examples where the PRACH transmission is performed. In addition, the DCI format 1A to be used for the PDCCH order may include a new 1-bit 'PUSCH trigger A' field. The terminal apparatus 1 may determine which of the operations of FIG. 7 to FIG. 9 is to be applied depending on the value of the 1-bit 'PUSCH trigger A' field. For example, in a case where the 'PUSCH trigger A' field is one, the operation of FIG. 7 and FIG. 8 may be applied. Alternatively, for example, in a case where the 'PUSCH trigger A' field is zero, the operation of FIG. 9 may be applied.

Hereinafter, in the present embodiment, the type of the uplink LBT procedure to be used for the PRACH transmission may be determined based on whether the preamble transmission is a first-time transmission or a re-transmission.

In an exemplar case where the preamble transmission is a first-time transmission, the terminal apparatus 1 always performs the type-2 uplink LBT procedure in the PRACH resource to be used for the first-time preamble transmission before performing the first-time preamble transmission. In a case where the preamble transmission is a re-transmission the terminal apparatus 1 determines the type of the uplink LBT procedure based on whether or not the PRACH resource to be used for the re-transmission of the preamble is within the period of the uplink duration d. In a case where the PRACH resource to be used for the re-transmission of the preamble is within the period of the uplink duration d, the terminal apparatus 1 may perform the type-2 uplink LBT procedure before performing the re-transmission of the preamble. Alternatively, in a case where the PRACH resource to be used for the re-transmission of the preamble is outside of the period of the uplink duration d, the terminal apparatus 1 may perform the type-1 uplink LBT procedure before performing the re-transmission of the preamble. The information on the channel access priority class for the type 1 may be notified of by the RRC signaling from the base station apparatus 3. Alternatively, the information on the channel access priority class for the type 1 may be configured in advance by specifications or the like. For example, the value of the channel access priority class may be configured to one.

Description will be given below about an example where the random access procedure is triggered by the PDCCH order. In a case where the preamble transmission is a first-time transmission, the terminal apparatus 1 may perform, based on the LBT configuration information (LBT type, channel access priority class) included in the PDCCH order, the uplink LBT procedure in the PRACH resource to be used for the first-time transmission of the preamble before performing the first-time transmission of the preamble. In a case where the preamble transmission is a re-transmission the terminal apparatus 1 determines the type of the uplink LBT procedure based on whether or not the PRACH resource to be used for the re-transmission of the preamble is within the period of the uplink duration d. In a case where the PRACH resource to be used for the re-transmission of the preamble is within the period of the uplink duration d, the terminal apparatus 1 may perform the type-2 uplink LBT procedure without using the configuration information included in the PDCCH order before performing the re-transmission of the preamble. Alternatively, in a case where the PRACH resource to be used for the re-transmission of the preamble is outside of the period of the uplink duration d, the terminal apparatus 1 may perform the type-1 uplink LBT procedure before performing the re-transmission of the preamble.

Description will be given below about another example where the random access procedure is triggered by the PDCCH order. In a case where the preamble transmission is a first-time transmission, the terminal apparatus 1 may perform, based on the LBT configuration information (LBT type, channel access priority class) included in the PDCCH order, the uplink LBT procedure in the PRACH resource to be used for the first-time transmission of the preamble before performing the first-time transmission of the preamble. In a case where the preamble transmission is a re-transmission, the terminal apparatus 1 may perform the type-1 uplink LBT procedure in the PRACH resource to be used for the re-transmission of the preamble before performing the re-transmission of the preamble.

Description will be given below about another example where the random access procedure is triggered by the PDCCH order. In a case where the preamble transmission is a first-time transmission, the terminal apparatus 1 may perform the type-2 uplink LBT procedure before performing the first-time preamble transmission in the PRACH resource to be used for the first-time preamble transmission. In a case where the preamble transmission is a re-transmission, the terminal apparatus 1 may perform the type-1 uplink LBT procedure in the PRACH resource to be used for the re-transmission of the preamble before performing the re-transmission of the preamble.

Hereinafter, various aspects of the terminal apparatus 1 and the base station apparatus 3 according to the present embodiment will be described.

(1) A first aspect of the present embodiment provides a terminal apparatus 1 including: a reception processing unit 205 configured to receive a PDCCH including a DCI format 1C to which CRC parity bits scrambled with a CC-RNTI are added; a channel measurement unit 208 configured to perform an uplink LBT; and a transmission processing unit 209 configured to transmit a preamble in an LAA cell. In the terminal apparatus, a type of an uplink LBT procedure for a PRACH transmission is determined based on whether or not a PRACH resource to be used for the PRACH transmission is included at least in a subframe in an uplink duration in which no downlink physical channel is received. In addition, a value of the uplink duration is given based at least on an 'Uplink transmission duration and offset indication' field included in the DCI format 1C.

(2) In the first aspect of the present embodiment, in a case that the PRACH resource is in the subframe in the uplink duration, the uplink LBT procedure for the PRACH transmission may be determined to be a type-2 uplink LBT procedure; and in a case that the PRACH resource is in a subframe outside the uplink duration, a type of the uplink LBT procedure for the PRACH transmission may be determined to be a type-1 uplink LBT procedure.

(3) In the first aspect of the present embodiment, in the case that the PRACH resource is in the subframe in the uplink duration, the PRACH transmission may be performed; and in the case that the PRACH resource is in the subframe outside of the uplink duration, no PRACH transmission may not be performed.

(4) A second aspect of the present embodiment provides a base station apparatus 3 including: a transmission processing unit 111 configured to transmit a PDCCH including a DCI format 1C to which CRC parity bits scrambled with a CC-RNTI are added; and a reception processing unit 109 configured to receive a preamble in an LAA cell. In the base station apparatus 3, a type of an uplink LBT procedure for a PRACH transmission is determined based on whether or not a PRACH resource to be used for the PRACH transmission is included at least in a subframe in an uplink duration in which no downlink physical channel is received. In addition, a value of the uplink duration is given based at least on an 'Uplink transmission duration and offset indication' field included in the DCI format 1C.

(5) In the second aspect of the present embodiment, in a case that the PRACH resource is in the subframe in the uplink duration, the uplink LBT procedure for the PRACH transmission may be determined to be a type-2 uplink LBT procedure; and in a case that the PRACH resource is in a subframe outside the uplink duration, a type of the uplink LBT procedure for the PRACH transmission may be determined to be a type-1 uplink LBT procedure.

(6) In the second aspect of the present embodiment, in the case that the PRACH resource is in the subframe in the uplink duration, the PRACH transmission may be performed; and in the case where the PRACH resource is in the subframe outside the uplink duration, no PRACH transmission may not be performed.

Hence, the terminal apparatus 1 can perform PRACH transmission efficiently. In addition, the base station apparatus 3 can receive the PRACH transmission efficiently.

Each of a program running on a base station apparatus 3 and a terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (an apparatus group) constituted of multiple apparatuses. Each of the apparatuses constituting such an apparatus group may include a portion or all of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B, 1C) Terminal apparatus
3 Base station apparatus
101 Higher layer processing unit
103 Preamble detection unit
105 Synchronization timing measurement unit
107 Control unit
108 Channel measurement unit
109 Reception processing unit
111 Transmission processing unit
1011 Radio resource control unit
1012 Random access control unit
1013 Receive antenna
1014 Transmit antenna
201 Higher layer processing unit
203 Control unit
205 Reception processing unit
207 Preamble generation unit
208 Channel measurement unit
209 Transmission processing unit
2011 Radio resource control unit
2012 Random access processing unit
2013 Receive antenna
2014 Transmit antenna

The invention claimed is:

1. A terminal apparatus comprising:
reception circuitry configured to receive a downlink control information (DCI) format indicating uplink duration; and
transmission circuitry configured to transmit a physical random access channel (PRACH) by using a preamble and a a PRACH resource, the preamble being selected randomly by the terminal apparatus from a plurality of preambles, and the PRACH resource being configured by radio resource control (RRC) signaling,
wherein the transmission circuitry is configured to:
in a case that the PRACH resource is within the uplink duration, transmit the PRACH; and
in a case that the PRACH resource is outside of the uplink duration, not transmit the PRACH.

2. The terminal apparatus according to claim 1, wherein
in a case that the PRACH resource is within the uplink duration, a transmission counter PREAMBLE_TRANSMISSION_COUNTER is incremented, and
in a case that the PRACH resource is outside of the uplink duration, the transmission counter PREAMBLE_TRANSMISSION_COUNTER is not incremented.

3. A base station apparatus comprising:
transmission circuitry configured to transmit a downlink control information (DCI) format indicating uplink duration; and
reception circuitry configured to receive a physical random access channel (PRACH) by using a preamble and a a PRACH resource, the preamble being selected randomly by the terminal apparatus from a plurality of preambles, and the PRACH resource being configured by radio resource control (RRC) signaling,
wherein the reception circuitry is configured to:
in a case that the PRACH resource is within the uplink duration, receive the PRACH; and
in a case that the PRACH resource is outside of the uplink duration, not receive the PRACH.

4. A communication method of a terminal apparatus comprising:
receiving a downlink control information (DCI) format indicating uplink duration;
transmitting a physical random access channel (PRACH) by using preamble and a PRACH resource, the preamble being selected randomly by the terminal apparatus from a plurality of preambles, and the PRACH resource being configured by radio resource control (RRC) signaling; and
not transmitting the PRACH, in a case that the PRACH resource is outside of the uplink duration.

5. A communication method of a base station apparatus comprising:
transmitting a downlink control information (DCI) format indicating uplink duration;
receiving a physical random access channel (PRACH) by using a preamble and a PRACH resource, the preamble being selected randomly by the terminal apparatus from a plurality of preambles, and the PRACH resource being configured by radio resource control signaling and
not receiving the PRACH, in a case that the PRACH resource is outside of the uplink duration.

* * * * *